(12) United States Patent
Broussard et al.

(10) Patent No.: US 7,526,515 B2
(45) Date of Patent: Apr. 28, 2009

(54) METHOD AND SYSTEM FOR A GRID-ENABLED VIRTUAL MACHINE WITH MOVABLE OBJECTS

(75) Inventors: Scott J. Broussard, Cedar Park, TX (US); Ying Liu, Austin, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 10/761,998

(22) Filed: Jan. 21, 2004

(65) Prior Publication Data

US 2005/0160413 A1 Jul. 21, 2005

(51) Int. Cl.
*G06F 3/048* (2006.01)
*G06F 9/45* (2006.01)

(52) U.S. Cl. ................... 707/205; 717/148
(58) Field of Classification Search .......... 707/100, 707/205, 101; 709/316; 717/148
See application file for complete search history.

(56) References Cited

U.S. PATENT DOCUMENTS

| 6,842,175 | B1 * | 1/2005 | Schmalstieg et al. | 345/427 |
| 6,959,430 | B2 * | 10/2005 | Sokolov et al. | 717/118 |
| 7,203,944 | B1 * | 4/2007 | van Rietschote et al. | 718/104 |
| 2003/0028865 | A1 * | 2/2003 | Sokolov et al. | 717/149 |

OTHER PUBLICATIONS

"Intel-based Sequent NUMA-Q™ 2000 Platform Demonstrates New Levels of Power and Scalability in Mixed UNIX/NT Environment", Intel. Corp., www.intel.com/pressroom/archive/releases/sp82597b.htm, Aug. 25, 1997.

"Jini Network Technology—General FAQs", Sun Microsystems, Inc., wwws.sun.com/software/jini, 1994.

Getov et al., "Multiparadigm Communications in Java for Grid Computing", *Communications of the ACM*, v. 44, n. 10, pp. 118-125, Oct. 2001.

Nieuwpoort et al., "Ibis: an Efficient Java-based Grid Programming Environment", *Proceedings of the 2002 joint ACM-ISCOPE conference on Java Grande (JGI '02)*, pp. 18-27, Nov. 2002.

(Continued)

*Primary Examiner*—Charles Rones
*Assistant Examiner*—Fariborz Khoshnoodi
(74) *Attorney, Agent, or Firm*—Yee & Associates, P.C.; Herman Rodriguez

(57) ABSTRACT

A method, an apparatus, a computer program product, and a data processing system provide for operation of a virtual machine with embedded functionality for interoperating with other virtual machines in a computational grid. A plurality of virtual machines are run on one or more devices within a data processing system; each virtual machine in the plurality of virtual machines incorporates functionality for interoperating and associating with other virtual machines in a virtual machine cluster in a grid-like manner. Each virtual machine in the virtual machine cluster acts as a node within the virtual machine cluster. A virtual machine manages its objects in association with an object group, and each virtual machine may manage multiple object groups. The virtual machines share information such that the object groups can be moved between virtual machines in the virtual machine cluster, thereby allowing the virtual machine cluster to act as one logical virtual machine.

3 Claims, 15 Drawing Sheets

OTHER PUBLICATIONS

Villacis, "A Note on the Use of Java in Scientific Computing", *ACM SIGAPP Applied Computing Review*, v. 7, n. 1, pp. 14-17, Spring 1999.

Fuad et al., "AdJava—Automatic Distribution of Java Applications", *Proceedings of the Twenty-Fifth Australasian Conference on Computer Science (ACS2002)*, pp. 65-75, Jan. 2002.

Kielmann et al., "Enabling Java for High-Performance Computing", *Communications of the ACM*, v. 44, n. 10, pp. 110-117, Oct. 2001.

Chen et al., "JVM for a Heterogeneous Shared Memory System", *Second Workshop on Caching, Coherence, and Consistency (WC3 '02) in conjunction with the 16th Annual ACM International Conference on Supercomputing (ICS 2002)*, Jun. 2002.

Aridor et al., "A high performance cluster jvm presenting a pure single system image", *Proceedings of the ACM 2000 JavaGrande Conference*, pp. 168-177, Jun. 2000.

Smith et al., "A Multithreaded Java Grande Benchmark Suite", *Third Workshop on Java for High Performance Computing in conjunction with the 15th Annual ACM International Conference on Supercomputing (ICS 2001)*, Jun. 2001.

Krishnaswamy et al., "Efficient Implementations of Java Remote Method Invocation (RMI)", *Proceedings of the 4th USENIX Conference on Object-Oriented Technologies and Systems (COOTS)*, pp. 19-27, Apr. 1998.

Ma et al., "JESSICA: Java-Enabled Single-System-Image Computing Architecture", *Journal of Parallel and Distributed Computing*, v. 60, n. 10, pp. 1194-1222, Oct. 2000.

Ranganathan et al., "Network-aware Mobile Programs", ACM Press, 1999, pp. 1-12.

Acharya et al., "Sumatra: A Language for resource-aware Mobile Programs", ACM Digital Library, 1996, pp. 1-22.

* cited by examiner

VIRTUAL MACHINE
CLUSTER/GRID

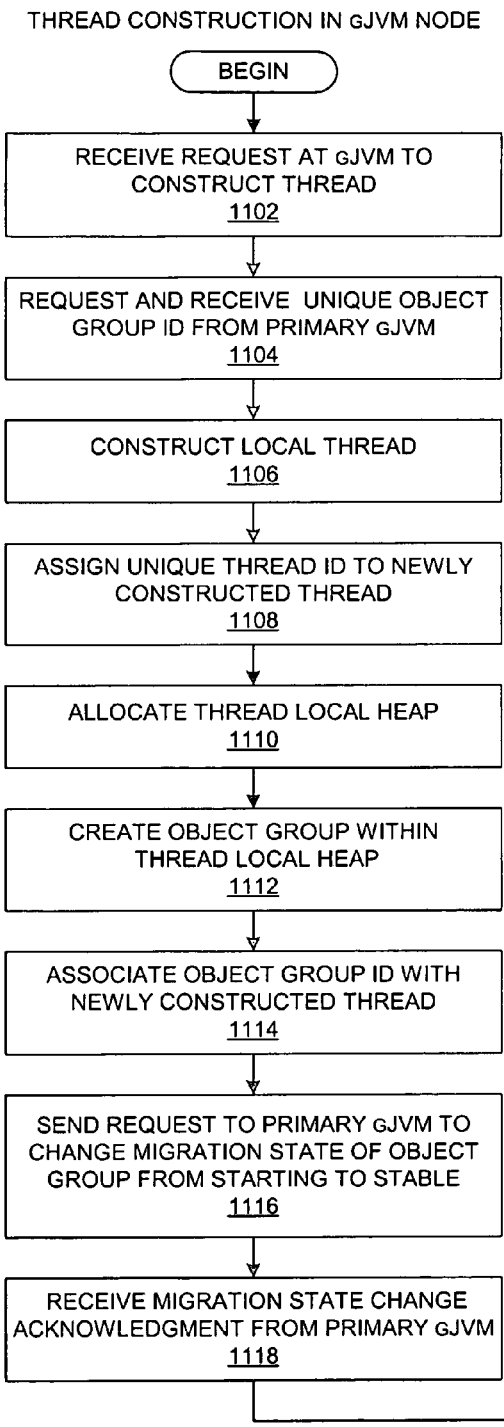# 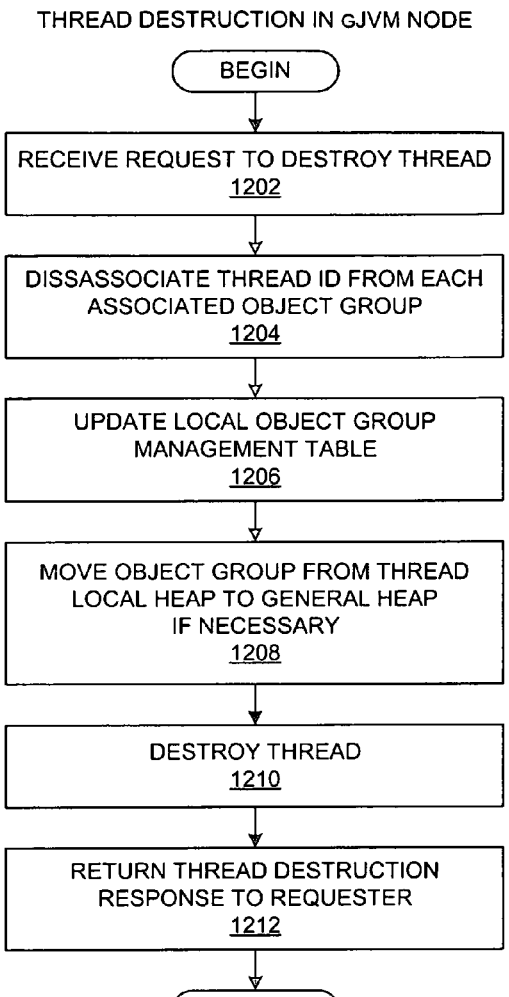
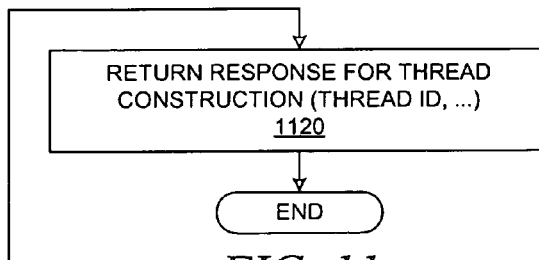
FIG. 12
FIG. 11

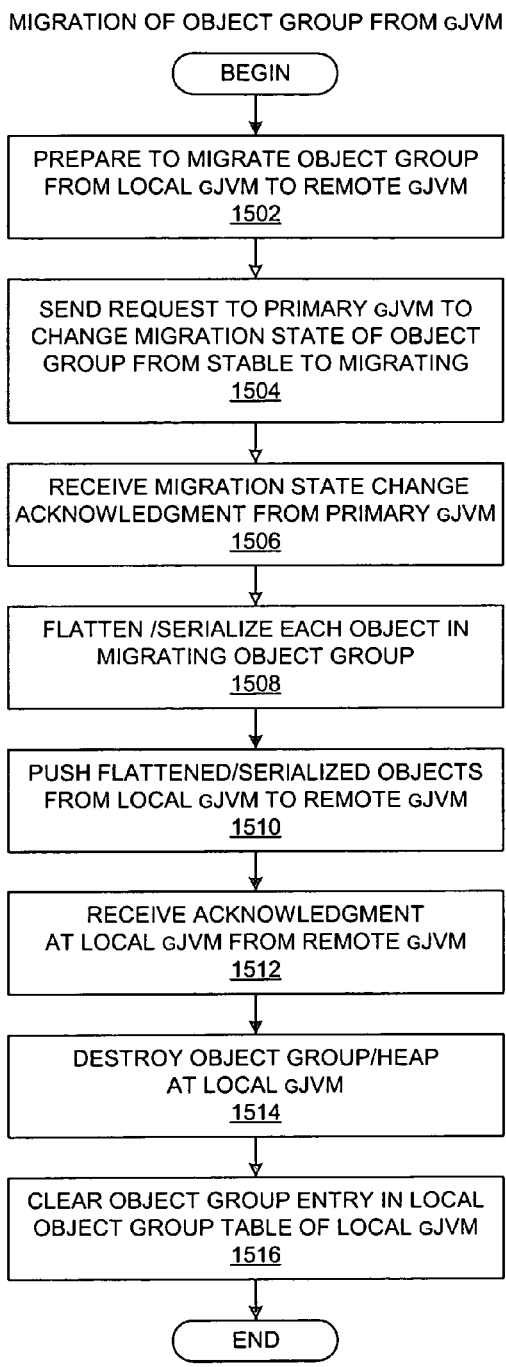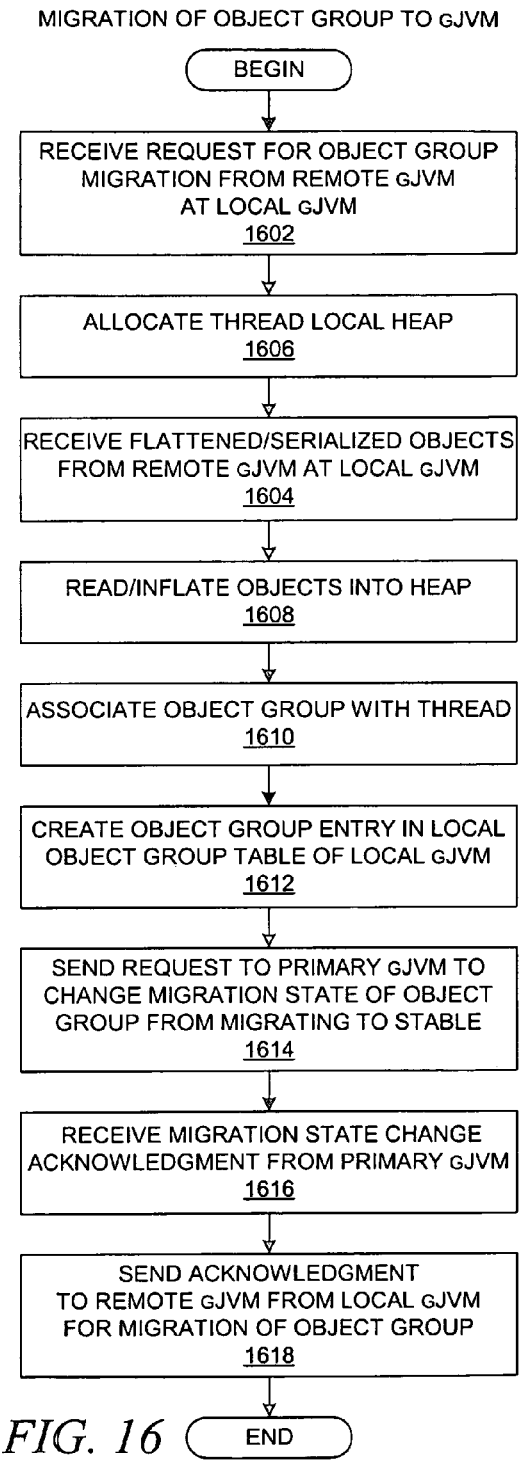

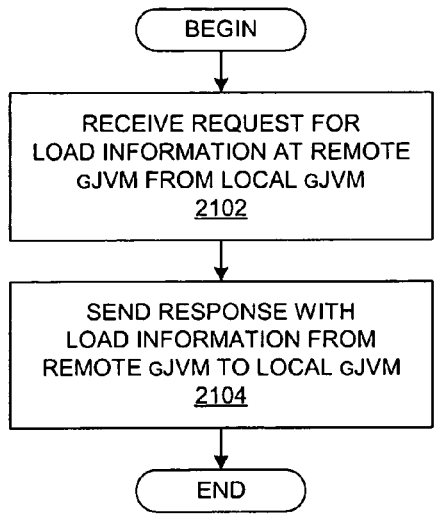
FIG. 21
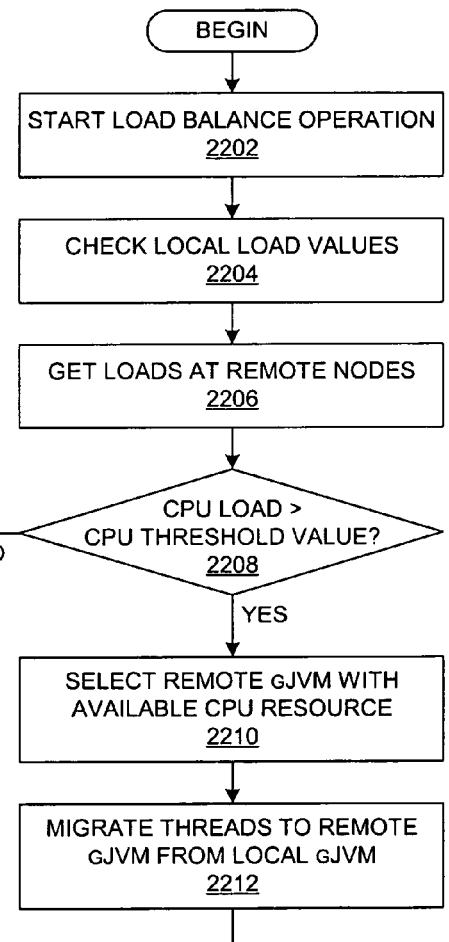
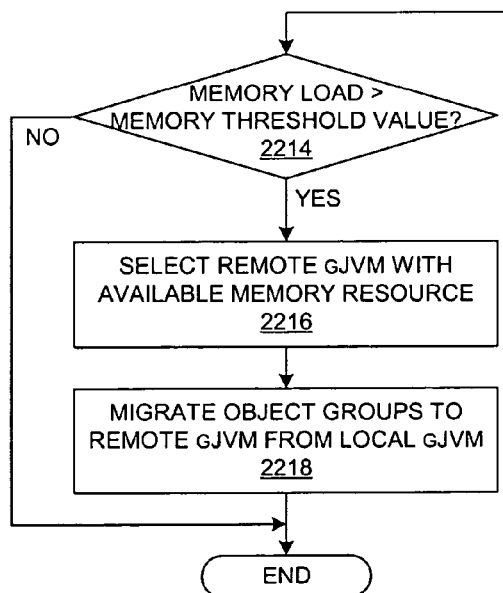
FIG. 22

METHOD AND SYSTEM FOR A GRID-ENABLED VIRTUAL MACHINE WITH MOVABLE OBJECTS

CROSS-REFERENCE TO RELATED APPLICATIONS

The present invention is related to the following patent application, hereby incorporated by reference: "Method and System for Grid-enabled Virtual Machines with Distributed Management Of Applications", U.S. patent application Ser. No. 10/762,000, filed Jan. 21, 2004.

BACKGROUND OF THE INVENTION

1. Field of the Invention

The present invention relates to an improved data processing system and, in particular, to a method and apparatus for multicomputer data transferring and program execution.

2. Description of Related Art

The widespread adoption of Internet-related and Web-related technology has enabled the growth of a global network of interconnected computers that are physically supported by many thousands of organizations and businesses and many millions of individuals. Recently, enterprises have exerted effort to organize the computational capacity of many computers into a grid, which is a logical organization of many computers for providing a collective sharing of computational capacity and datastore capacity while maintaining local autonomous control over individual computers.

For example, many enterprises are cooperating within the Global Grid Forum™, which is supported by GGF, Inc., to develop community-driven standards for grid computing. The Globus Projects™ is one effort that has been supported by government agencies, corporations, and universities to develop grid-related technologies, which has resulted in the development of the Open Grid Services Architecture (OGSA), which is an initiative for incorporating grid concepts within a service-oriented framework based on Web services. The Globus Toolkit® is an implementation of the Open Grid Services Architecture that provides software programming tools for developing grid-enabled applications, and the Java® Community Grid (CoG) Kit is the portion of the Globus Toolkit® that provides access to grid services through a Java® framework.

Although the Java® CoG Kit supports a Java® application in accessing grid services, the Java® CoG Kit does not incorporate the computational characteristics of a grid into a Java® virtual machine (JVM). Therefore, it would be advantageous to have a method, a system, an apparatus, and/or a computer program product that incorporates computational characteristics of a grid within a virtual machine. It would be particularly advantageous to perform object management within a virtual machine such that the virtual machine may be implemented within a dynamically changing, grid computing environment.

SUMMARY OF THE INVENTION

A method, an apparatus, a computer program product, and a data processing system provide for the operation of a virtual machine with embedded functionality for interoperating with other virtual machines in a computational grid. A plurality of virtual machines are run on one or more devices within a data processing system; each virtual machine in the plurality of virtual machines incorporates functionality for interoperating and associating with other virtual machines in a virtual machine cluster in a grid-like manner. Each virtual machine in the virtual machine cluster acts as a node within the virtual machine cluster. A virtual machine manages its objects in association with an object group, and each virtual machine may manage multiple object groups. The virtual machines share information such that the object groups can be moved between virtual machines in the virtual machine cluster, thereby allowing the virtual machine cluster to act as one logical virtual machine. A single application image conforming to a typical application model can be executed within the grid-enabled virtual machine cluster in a way that enables the execution of the application to span multiple instances of a grid-enabled virtual machine, thereby allowing the execution of the application to span multiple devices.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 11 depicts a flowchart that shows a process on a clustered virtual machine during which a thread is constructed;

FIG. 12 depicts a flowchart that shows a process on a clustered virtual machine during which a thread is destroyed;

FIG. 15 depicts a flowchart that shows a process on a local clustered virtual machine for migrating an object group to a remote clustered virtual machine;

FIG. 16 depicts a flowchart that shows a process on a local clustered virtual machine for accepting the migration of an object group from a remote clustered virtual machine;

FIG. 21 depicts a flowchart that shows a process on a local clustered virtual machine for responding to a request from a clustered virtual machine for the current load or performance information at the local clustered virtual machine;

FIG. 22 depicts a flowchart that shows a process on a local clustered virtual machine for determining to migrate threads and/or object groups from the local clustered virtual machine to a remote clustered virtual machine in accordance with load or performance information.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
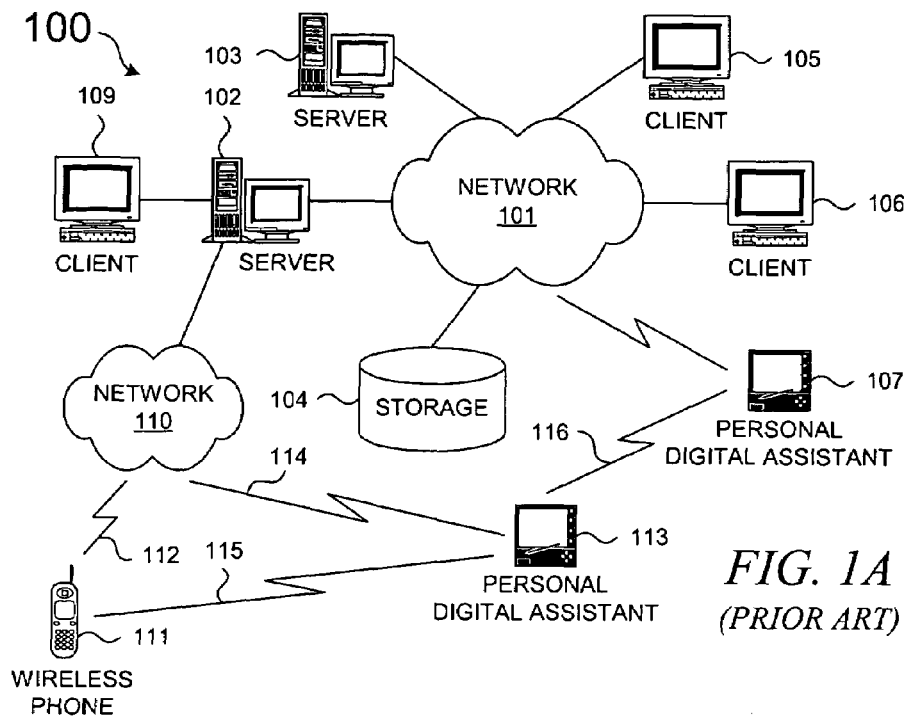
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116. The present invention could be implemented on a variety of hardware platforms; FIG. 1A is intended as an example of a heterogeneous computing environment and not as an architectural limitation for the present invention.

Figure 1B:
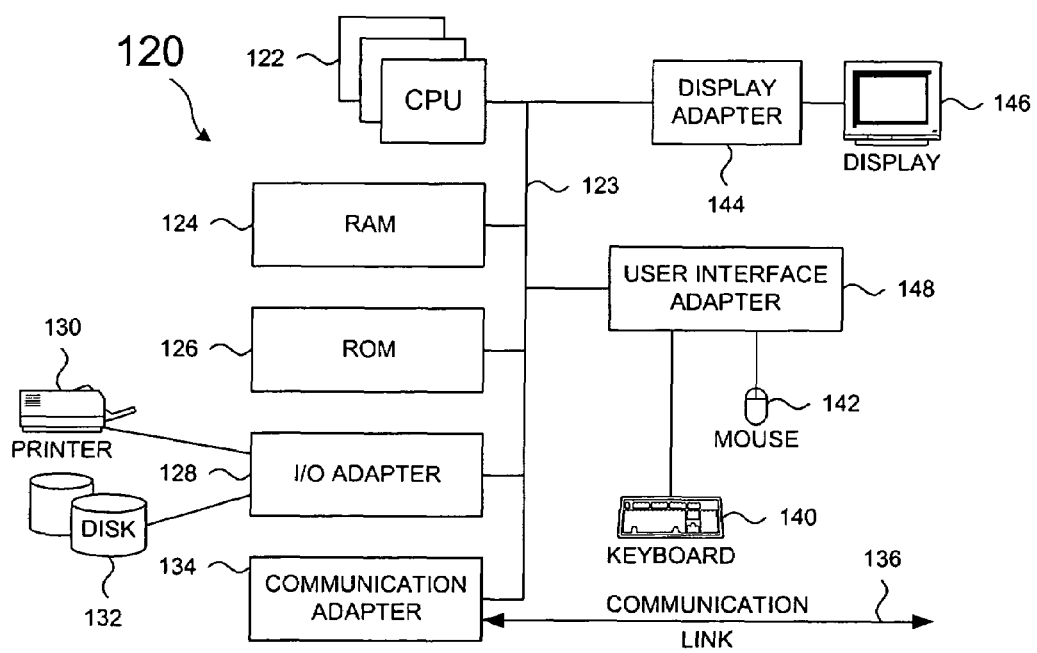
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats and languages, such as graphic files, word processing files, Extensible Markup Language (XML), Hypertext Markup Language (HTML), Handheld Device Markup Language (HDML), Wireless Markup Language (WML), and various other formats and types of files.

Virtual Machine Cluster/Grid

The present invention may be implemented on a variety of hardware and software platforms, as described above with respect to FIG. 1A and FIG. 1B. More specifically, though, the present invention is directed to an improved virtual machine that includes computational characteristics of a grid within the improved virtual machine such that the improved virtual machine may interact with similar improved virtual machines in a grid-like manner, as described with respect to the remaining figures. Although the following figures are described as incorporating Java® technology such that the present invention may be implemented as improved Java® virtual machines (JVMs), the present invention may be implemented in conjunction with technology for other types of virtual machines.

Figure 2:
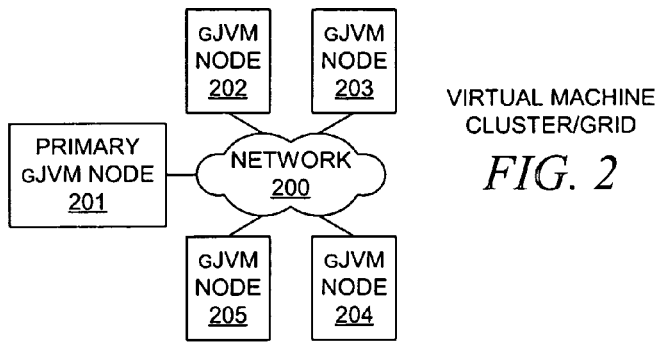
FIG. 2 depicts a block diagram that shows a virtual machine cluster in a distributed data processing system in accordance an implementation of the present invention.

With reference now to FIG. 2, a block diagram illustrates a virtual machine cluster/grid in a distributed data processing system in accordance with an implementation of the present invention. Network 200 connects a set of virtual machines 201-205; network 200 is similar to network 101 in FIG. 1, and virtual machines 201-205 may be supported on a variety of devices, such as any of the devices that are shown in FIG. 1.

By way of introducing terminology, a cluster is a set of two or more interacting entities. A cluster of virtual machines may be referred to as a virtual machine cluster, a virtual machine grid, or a logical virtual machine. A single virtual machine that contains functionality for operating in a cluster/grid may be referred to as a clusterable virtual machine or a grid-enabled virtual machine. A single virtual machine that is included within a cluster/grid may be referred to as a clustered virtual machine or a grid-embedded virtual machine.

As noted above, the present invention may be implemented within a Java® environment using Java® virtual machines that have been enhanced to include functionality for implementing an embodiment of the present invention. Alternatively, the present invention may be implemented within extensions to Java® class libraries. Thus, the terminology that is provided above may be used within a Java® context. Hereinafter, a grid-enabled JVM or a grid-embedded JVM is referred to as a gJVM. FIG. 2 shows network 200 connecting a gJVM cluster that contains gJVM's 201-205.

A single clustered virtual machine or a single grid-embedded virtual machine may be referred to as a node within a given virtual machine cluster, a given virtual machine grid, or a given logical virtual machine. In the example that is shown in FIG. 2, a set of virtual machines interact as multiple nodes within a single virtual machine cluster in a grid-like manner. The present invention supports a plurality of nodes in a virtual machine cluster, and a distributed data processing system may support more than one virtual machine cluster/grid. Moreover, a given device may support more than one clusterable/grid-enabled virtual machine or more than one clustered/grid-embedded virtual machine. In other words, a given device may support a first clustered/grid-embedded virtual machine and a second clustered/grid-embedded virtual machine, wherein the two clustered/grid-embedded virtual machines are included in two distinct and independent virtual machine clusters/grids; the two clustered/grid-embedded virtual machines and the two virtual machine clusters/grids would be uniquely identifiable and accessible.

Depending on the type of process that is being performed within a given virtual machine cluster/grid, it may be convenient to refer to interacting nodes within the given virtual machine cluster/grid as a local node or a remote node in order to distinguish between nodes. For example, from the perspective of a given gJVM, the given gJVM may be referred to as the local node, the local gJVM, or the local gJVM node; from the perspective of a given gJVM, a different gJVM that is interacting with the local node, whether on the same device or whether executing on another device, may be referred to as a remote node, a remote gJVM, a remote gJVM node.

The present invention is directed to transparently allowing an application to run on a set of machines or devices, each of which support at least one clustered virtual machine node. For example, a multithreaded Java® application may run over multiple gJVM's, and the application would not be aware nor need be aware on which machines its threads were dispatched. The virtual machine cluster dynamically manages and distributes the threads of the application upon the available set of clustered virtual machines.

Each virtual machine cluster has a single primary node. In FIG. 2, gJVM node 201 is a primary gJVM node, and gJVM nodes 202-205 are non-primary gJVM nodes. The primary node may have certain duties or responsibilities that are performed for the non-primary nodes within the cluster. For example, the primary node may have a set of objects that define the application environment and context for the application, such as for file access and class loading (classpath) for the virtual machine cluster.

Primary nodes and non-primary nodes may be started in slightly different manners, thereby providing an indication to a given clusterable virtual machine that it is to act as a primary node or as a non-primary node. For example, a clusterable virtual machine in a Java® environment may be started with the following exemplary instantiation command:

java [-main -clusterName] [mainClass]

The "java" command may instantiate a clusterable virtual machine, i.e., start the execution of a given copy of a clusterable virtual machine. The "-main" parameter indicates that a particular instance of a gJVM is to act as a primary gJVM node within a gJVM cluster that is identified by the "-clusterName" parameter; when a particular instance of a gJVM is to act as a non-primary gJVM node, the instantiation command would not include the "-main" parameter. The "mainClass" parameter specifies the main program to be run by the gJVM. In this manner, the software modules that comprise a primary node and a non-primary node may be copies of each other, thereby making the software essentially similar, i.e., a primary node and a non-primary node may be so-called peers or clones, although a primary node and a non-primary node may exhibit different behavior due to a primary node undergoing a slightly different instantiation process than a non-primary node.

Since a primary node and the non-primary nodes may simply be independent instances of a clusterable virtual machine, wherein the primary node and the non-primary nodes merely function in accordance with two different modes of operation, e.g., by being initialized in different manners, a primary node can delegate or hand-off its responsibilities to a non-primary node in order to enable the primary node to shutdown for maintenance or for other purposes after the system has been started.

Grid-Enabled Virtual Machine

Figure 3A:
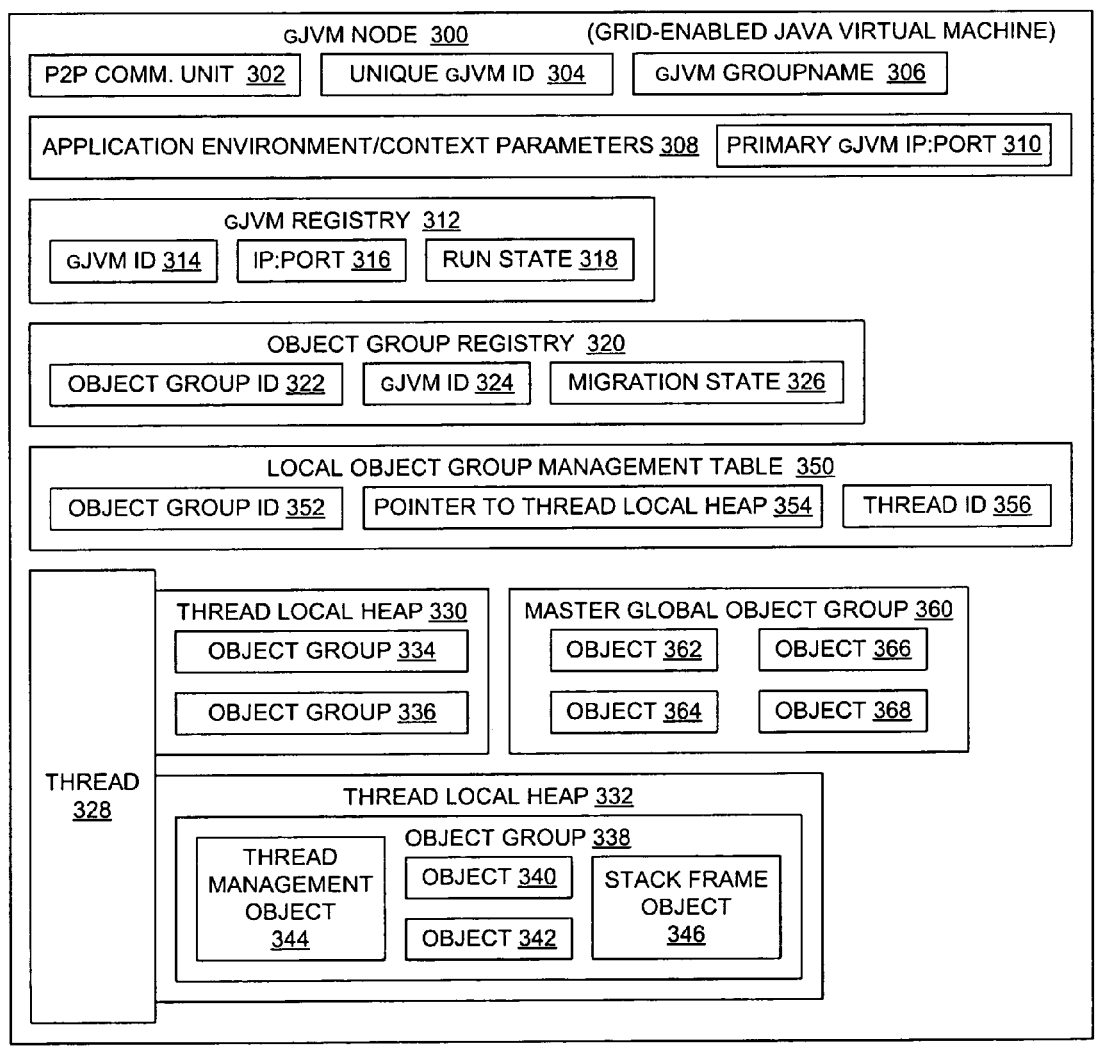
FIG. 3A depicts a block diagram that shows components and/or information that may be used to enhance a virtual machine as a clusterable virtual machine in accordance with an implementation of the present invention.

With reference now to FIG. 3A, a block diagram illustrates components and/or information that may be used to enhance a virtual machine as a clusterable/grid-enabled virtual machine in accordance with an implementation of the present invention. FIG. 3A depicts gJVM node 300 that represents a single clusterable virtual machine, such as any of nodes 201-205 in FIG. 2. Although not shown, gJVM node 300 comprises other components and information for performing various tasks in a manner similar to a typical JVM; in other words, gJVM node 300 can be considered to be a typical JVM that has been enhanced to include the functionality of the present invention. Although gJVM node 300 is shown as containing multiple types of tables, one of ordinary skill in the art would understand that different types of information and different information formats may be managed by a given clusterable virtual machine node to effect the functionality of the present invention.

P2P communication unit 302 allows each gJVM to communicate with any other gJVM in a peer-to-peer fashion, particularly to communicate a gJVM's performance information to another gJVM. For example, a gJVM may communicate its CPU load factor, its memory factor, and its communication queue load factors to other gJVM's such that the virtual machine cluster can balance its overall load in a distributed manner. Unique gJVM ID 304 is a data value that represents the unique virtual machine identifier that has been assigned to a particular gJVM within a given gJVM cluster that is identified by gJVM group name 306. Application environment/context parameters 308 define various values and information that may be needed during the lifetime of gJVM 300 for obtaining additional information from its runtime environment and for interacting with its runtime environment. For example, each gJVM may need to know the primary gJVM IP address and port values 310 at which the primary gJVM is configured in order to communicate with the primary gJVM.

Each clustered virtual machine has a run state, e.g., stopped, starting, started, and stopping. When a new node is being instantiated within a virtual machine cluster, i.e., added to the plurality of virtual machines already within the virtual machine cluster, information about its existence is disseminated throughout the virtual machine cluster; when a particular node within the virtual machine cluster is being stopped, i.e., removed from the remainder of the plurality of virtual machines within the virtual machine cluster, which may occur without stopping the entire virtual machine cluster, information about the stoppage of the particular node is disseminated throughout the virtual machine cluster. In the example that is shown in FIG. 3A, it is assumed that each gJVM node maintains a local copy of a list of gJVM nodes within the gJVM cluster, which is shown as gJVM registry 312; gJVM node 300 may receive updated information about the status of other nodes, which is then reflected within gJVM registry 312. In this manner, gJVM registry 312 provides a registry of gJVM's that are known to gJVM node 300. gJVM registry 312 contains a list of characteristic values for each known gJVM, such as its unique gJVM ID 314, its IP address and port 316, and its run state 318. Each of the gJVM's within the gJVM cluster may communicate various workload or computational resource utilization parameters to each other so that they can determine where to dispatch threads.

After a gJVM has been started, it may accept thread work from its gJVM cluster; when it is stopping, it moves its threads and associated objects to another gJVM. In contrast to a typical virtual machine, the present invention provides a clusterable virtual machine in which objects are movable between gJVM nodes, thereby allowing a thread and its associated objects to be moved when an instance of a clusterable virtual machine is being stopped.

In a typical prior art system, remote objects are addressed via a combination of an IP address, a TCP/IP port number, and an object identifier reference; remote method invocation (RMI) references or Common Object Request Broker Architecture (CORBA) references also contain other information of relatively large size. In contrast to a typical virtual machine in which stub classes might be used in a typical RMI or CORBA implementation, the present invention provides object references such that access to objects is managed transparently within the gJVM runtime environment without stub classes, as explained in more detail below.

To support movable objects within the present invention, objects are associated with an object group, i.e., logically contained within an object group. As long as an object exists, its association with a particular object group ensures that the object group will continue to exist. In other words, an object group continues to exist as long as it has at least one object. When all of the objects in an object group have been garbage collected, then the object group would be garbage collected as well.

Object groups can be moved amongst clustered virtual machines. An accessible object group exists solely on a single clustered virtual machine; access to an object group may be restricted while the object group is in a migratory state between clustered virtual machines. Hence, each clustered virtual machine has information about the location of an object group within the virtual machine cluster.

In the example that is shown in FIG. 3A, object group registry 320 contains a list of object group IDs that are known to gJVM 300 and other associated information to locate those object groups within the gJVM cluster of gJVM 300, thereby associating each known object group with a gJVM that is known to gJVM 300. For example, a particular object group is represented by object group ID 322; the gJVM node on which the object group assigned to object group ID 322 is identified by gJVM ID 324, and the migratory state of the object group assigned to object group ID 322 is identified by migration state value 326, which may be one of a set of constant values, each of which represents a different possible migratory state.

In order to provide transparent access and provide movability of an object within a virtual machine cluster, the internal virtual machine's handle to the object, i.e., the object reference, contains a compact set of information items that provides for locating and accessing the object but does not specify the object's location. For example, the following Java® structure may be used to specify an object handle in a Java® environment:

```
Struct ObjectHandle {
    Int objectGroupID; // Unique object group ID
    Byte[ ] objectID; // Unique object ID of the object
    }
```

The ObjectHandle that is specified in the above-provided example allows an application that is executing within the gJVM cluster to access the corresponding object anywhere within the gJVM cluster. By knowing the unique object group identifier of a group of objects, any gJVM node can locate the identified object group within the gJVM cluster; for example, if the object group is managed in a table or other type of datastore that associates the object group identifier with a gJVM identifier, then the gJVM node on which the object resides can be determined. By using other information about the manner in which the gJVM node is addressed or accessed, the unique gJVM identifier can be used to communicate with the gJVM node on which the object resides; for example, if the gJVM identifier is managed in a table or other type of datastore that associates the gJVM identifier with an IP address and port number, e.g., as shown in gJVM registry 312, then the appropriate object group on the appropriate gJVM node can be accessed in some manner. Although a given gJVM node may be identified by an IP address and a port number, this information is not contained directly within an object reference, thereby allowing the object to be transparently moved amongst gJVM nodes. By knowing the unique object identifier for the object to be accessed, then the appropriate object within the object group on the appropriate gJVM node can be accessed in some manner.

Information about the locations of the object groups may be provided by a JVM singleton object that all gJVM nodes within the gJVM cluster can access to lookup the association between an object group identifier and the gJVM node that is hosting the object group. In the example that is shown in FIG. 3A, gJVM node 300 contains local information provided by object group registry 320; e.g., gJVM node 300 may retrieve or receive updates to the object group registry 320 from another gJVM node, e.g., the primary gJVM node, thereby allowing gJVM node 300 to perform quick and efficient local lookups.

Objects and their object groups are created within the heaps of a local gJVM node as necessary. An object may be referenced locally until an object reference is passed out of thread scope, at which point the object would be transparently accessed as a remote object, thereby allowing other threads potentially running on other machines to access it. In one embodiment, objects groups are preferably created in the thread local heaps of a gJVM node; alternatively, object groups may be created within other types of heaps within a clustered virtual machine. Each new thread is provided a new thread local heap when the thread is constructed; a thread may acquire additional thread local heaps as necessary. A thread local heap provides high performance because: most accesses of most objects are local to a particular thread; the objects can be easily garbage-collected; and a heap lock is not required to satisfy object allocations. A thread local heap is typically implemented as an object of a configurable size to which a particular thread has access. To satisfy a typical small object allocation, the thread local heap is split at one end to release the required space. If the thread local heap is not large enough to satisfy an allocation, the remainder of the thread local heap is discarded and is replaced by a fresh thread local heap. Large object allocations may bypass the thread local heap mechanism and may be satisfied directly from a larger heap within the virtual machine. FIG. 3A depicts a single thread 328 within gJVM node 300; thread 328 is associated with two thread local heaps 330 and 332, thereby illustrating that a thread may have a one-to-many association with multiple thread local heaps. Thread local heap 330 is shown as containing object group 334 and object group 336, which contain objects that are not shown in the figure; thread local heap 332 is shown as containing object group 338, which itself contains objects 340-342.

Information for managing a thread is stored within an object, and this object is also stored within an object group. Similarly, a thread's stack frame is managed as an object. FIG. 3A depicts thread management object 344 and stack frame object 346 for managing such information. In this manner, the instance data related to a thread is stored within an object group. If a thread is moved from one gJVM node to another gJVM node, the instance data is moved as part of the process of moving an object group. The thread code itself does not need to be stored in an object group; if the code is not present within memory, it is available from class files when necessary.

A new object group is also created when a new thread is constructed; an association is created between the object group and the newly constructed thread, which has a unique thread identifier. Thread identifiers are unique throughout a cluster; each clustered virtual machine has a unique virtual machine identifier, thereby allowing unique thread identifiers preferably to be based on a combination of the unique virtual machine identifier and a thread identifier that is unique within a given virtual machine.

Additional object groups may be added to a thread as necessary. In the example that is shown in FIG. 3A, local object group management table 350 contains a list of the object groups that are managed within gJVM node 300, i.e., the object groups that are stored within gJVM node 300, along with other associated information to manage those object groups within gJVM node 300. For example, a particular object group is represented by a row in the table, which contains object group ID 352, pointer 354 to the thread local heap that contains the particular object group, and thread identifier 356 that is associated with the object group; if object groups are alternatively created within other types of heaps within a clustered virtual machine, then different information would be managed within local object group management table 350.

As mentioned above, an object group may continue to exist as long as it has at least one object; even if the thread that was responsible for creating an object is terminated, the object may have been referenced by another thread that still requires its existence, thereby requiring the object group in which the object is located to continue to exist. Alternatively, master global object group 360 may be maintained within a gJVM node. When a thread is ended, all of the remaining objects that are contained in its associated object group (or associated object groups) that are still referenceable from other threads, e.g., objects 362-368, are moved to the master global object group. The master global object group would contain all objects that are referenced globally within the gJVM cluster even when the originating thread has ended, thereby allowing management of fewer object groups.

Object Group Movement within Virtual Machine Cluster/ Grid

Figure 3B:
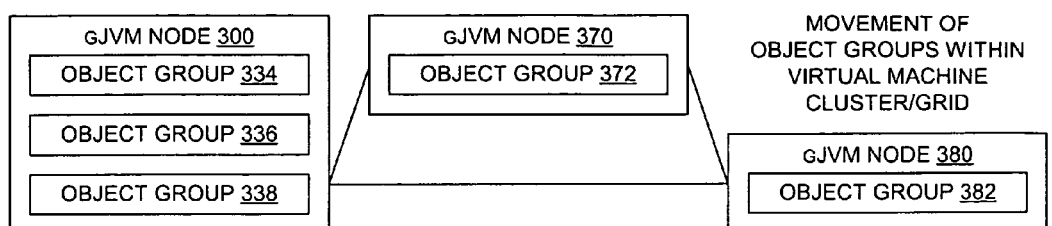
FIGS. 3B-3D depict a set of block diagrams that shows the transference of object groups between clustered virtual machines.
Figure 3C:
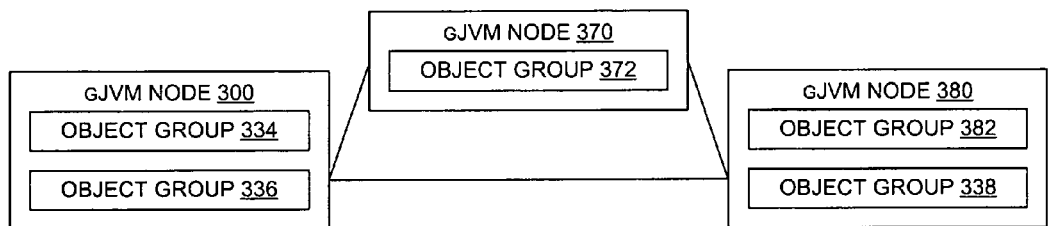
Figure 3D:
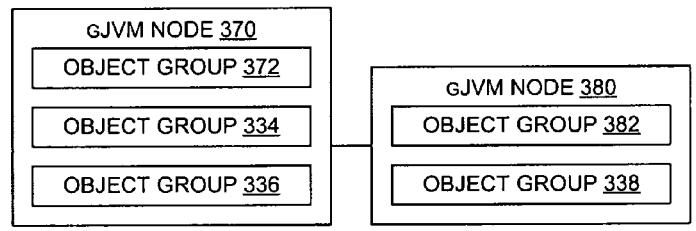

With reference now to FIGS. 3B-3D, a set of block diagrams illustrate the transference of object groups between clustered virtual machines in accordance with an embodiment of the present invention. FIGS. 3B-3D depict a set of gJVM nodes within a virtual machine cluster across a period of time; FIG. 3B depicts a point in time that is earlier than a point in time that is depicted in FIG. 3C, which is earlier than the point in time that is depicted in FIG. 3D. In a manner similar to FIG. 3A, FIG. 3B shows gJVM node 300 containing object groups 334, 336, and 338. In addition, gJVM node 370 contains object group 372, and gJVM node 380 contains object group 382.

As noted above, an object group may continue to exist as long as it has at least one object, even if the thread that was initially associated with the object group is terminated. FIG. 3C depicts the same gJVM nodes and the same object groups as FIG. 3B. However, FIG. 3C differs from FIG. 3B in that object group 338 has been transferred from gJVM node 300 to gJVM node 380; for example, the transfer may have occurred in response to the termination of the thread that was associated with object group 338, such as thread 328 that is shown in FIG. 3A.

As also noted above, an object group may continue to exist as long as it has at least one object, even if the clustered virtual machine which had constructed the object group has been stopped or terminated. FIG. 3D depicts a later point in time with some of the same gJVM nodes and object groups as FIG. 3C. However, FIG. 3D differs from FIG. 3C in that object groups 334 and 336 have been transferred from gJVM node 300 to gJVM node 370. For example, the transfer may have occurred in response to the termination of gJVM node 300 that was supporting object groups 334 and 336; when a given gJVM shuts down, the heaps and/or object groups on the given gJVM can be transferred to another machine, and the information in the gJVM nodes throughout the virtual machine cluster would be updated with the location of the object groups.

Garbage collection may also be performed within a virtual machine cluster. In a typical Java® virtual machine, garbage collection is done with a mark-and-sweep approach. In the mark-and-sweep approach, garbage collection is invoked either explicitly by an application or automatically when an application tries to allocate an object but memory utilization causes the object allocation operation to be difficult or not possible. The virtual machine goes through all objects, marks them, then sweeps all threads and statics (global data) to again mark all objects that can be traversed to. The virtual machine pauses all threads and then looks through the data structures of each thread's stack frame, whereby it marks all objects that are referenceable by any thread, possibly on an application by application basis. All objects that are not marked as referenceable are then destroyed or removed, thereby freeing memory for the virtual machine to allocate an object.

The majority of objects are typically objects that are only accessed by one thread. With the virtual machine cluster of the present invention, an object may be referenced remotely; when an object is remotely referenced, it is marked as such. In one embodiment, a gJVM node may have a separate daemon thread that runs at low priority and that periodically traverses the system to perform remote garbage collection processing. Each object may have a remote garbage collection bit that is to be used in a mark-and-sweep approach by the remote garbage collection daemon. If an object that has been remotely referenced is no longer being referenced within the gJVM node in which it was constructed, then the remote garbage collection daemon thread endeavors to determine whether the remote object reference still requires the existence of the object. The daemon thread may send a request message to other gJVM nodes to inquire whether a particular object that may be ready to be freed within the local gJVM is still being referenced by a remote gJVM; these requests may be batched up for multiple objects such that groups of references could be checked efficiently. If no remote gJVM nodes report that a particular object is still being remotely referenced, then the remote garbage collection daemon on the local gJVM node may initiate the objects removal; e.g., the remote garbage collection daemon might remove any indication that the object is/was remotely referenced, thereby allowing the object to be subsequently removed during the normal/local garbage collection process.

Initialization of Primary Grid-Enabled Virtual Machine

Figure 4:
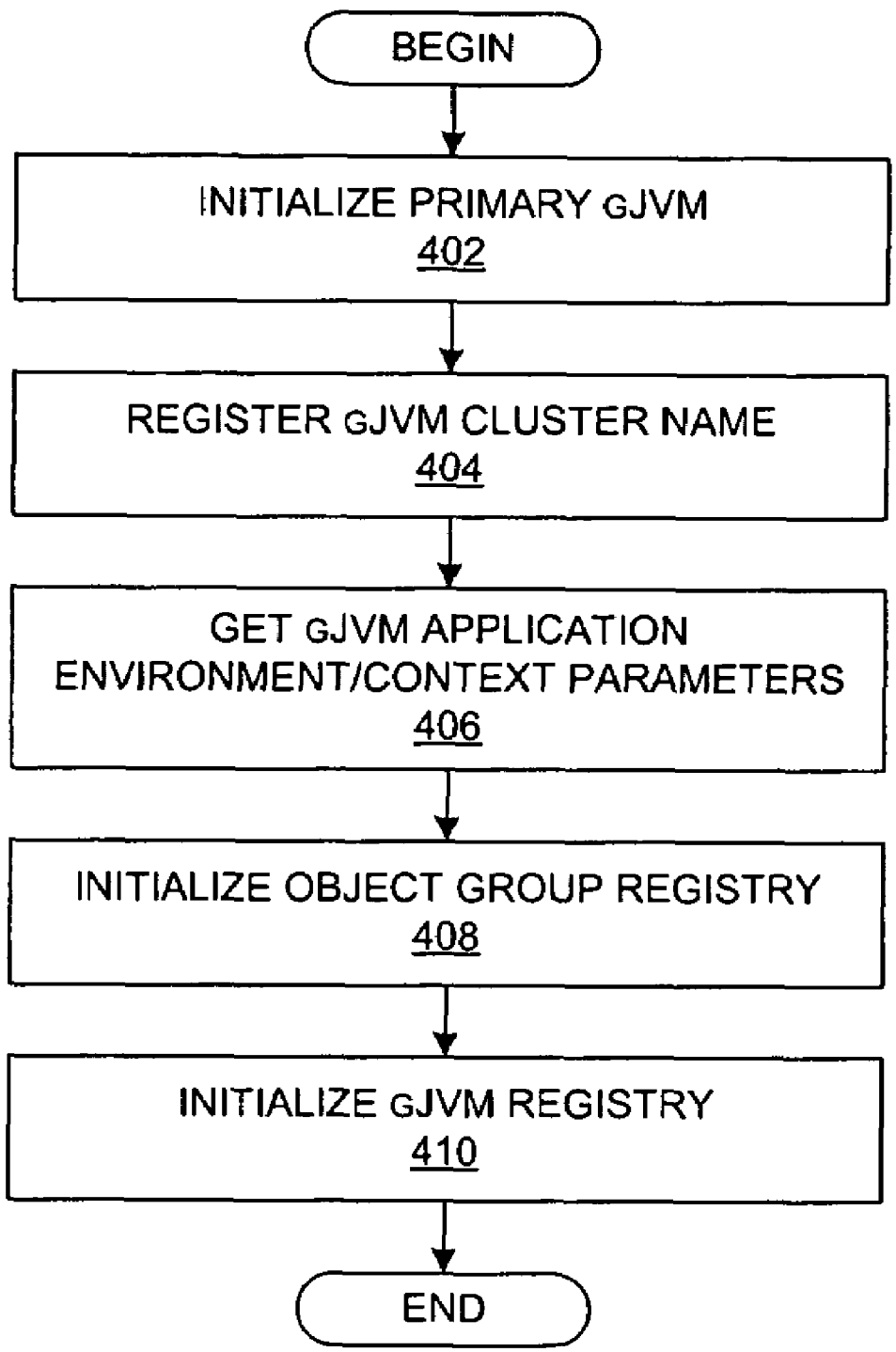
FIG. 4 depicts a flowchart that shows a process for initializing a primary cJVM node.

With reference now to FIG. 4, a flowchart illustrates a process for initializing a primary gJVM in accordance with an embodiment of the present invention. The process commences when the primary clustered virtual machine node is initialized (step 402), e.g., through the use of the instantiation command that was described above. The gJVM cluster name is registered in a manner that allows applications to lookup available gJVM clusters and that prevents name collisions with other gJVM clusters (step 404). The primary gJVM node obtains any environment parameters or context parameters that are to be employed by the newly started gJVM cluster (step 406) and stores the information in a manner that is available to all nodes in the gJVM cluster. The primary copy of the object group registry within the primary gJVM node is initialized (step 408), which is available thereafter for dissemination as copies to non-primary gJVM nodes, such as object group registry 320 that is shown in FIG. 3A. The primary copy of the gJVM registry within the primary gJVM node is also initialized (step 410), which is also available thereafter for dissemination as copies to non-primary gJVM nodes, such as gJVM registry 312 that is shown in FIG. 3A, thereby concluding the process.

Allocation or Registration of Unique IDs For Grid-Enabled Virtual Machine Nodes

Figure 5A:
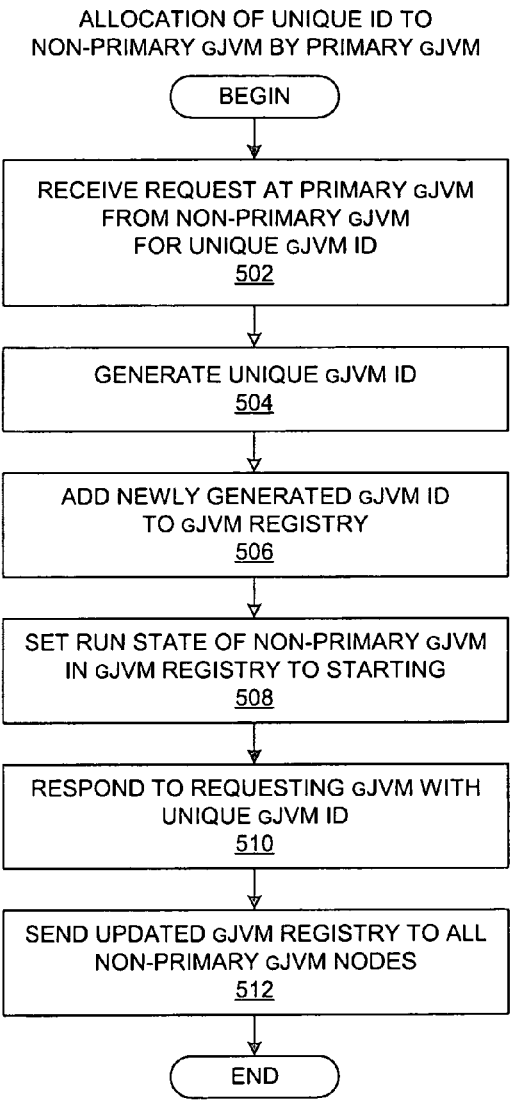
FIG. 5A depicts a flowchart that shows a process at a primary cJVM for allocating a unique cJVM identifier to a non-primary cJVM that is being initialized.

With reference now to FIG. 5A, a flowchart illustrates a process at a primary gJVM for allocating a unique gJVM identifier to a non-primary gJVM that is being initialized. The process commences when the primary gJVM receives a request from a non-primary gJVM for a unique gJVM identifier (step 502). The primary gJVM generates the unique gJVM identifier (step 504) and adds the newly generated gJVM identifier to the gJVM registry (step 506). The primary gJVM sets the run state of the non-primary gJVM in the gJVM registry to a starting state value (step 508), and then the primary gJVM responds to the requesting non-primary gJVM by sending a message containing the newly generated unique gJVM identifier (step 510). The primary gJVM then broadcasts a message that contains the updated gJVM registry to all of the non-primary gJVM nodes (step 512), thereby concluding the process.

Figure 5B:
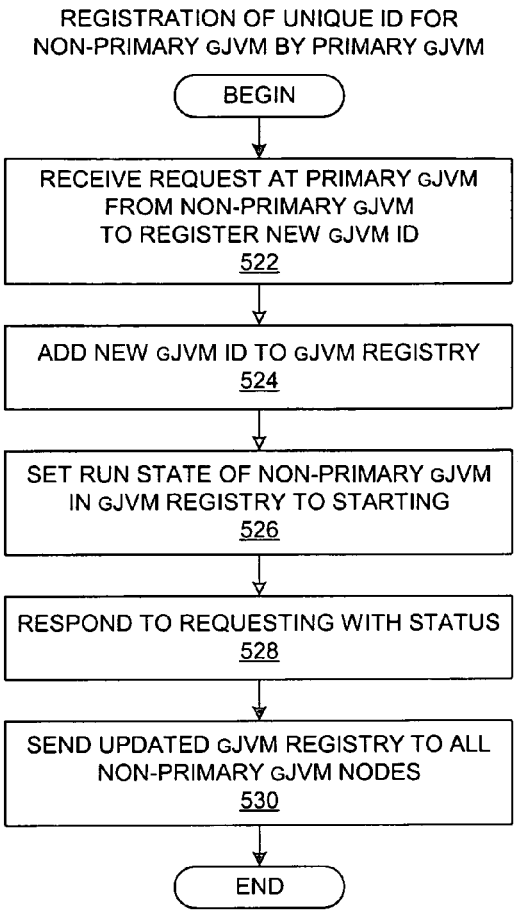
FIG. 5B depicts a flowchart that shows an alternative process at a primary cJVM for allocating a unique cJVM identifier to a non-primary cJVM that is being initialized.

With reference now to FIG. 5B, a flowchart illustrates an alternative process at a primary gJVM for allocating a unique gJVM identifier to a non-primary gJVM that is being initialized. The process commences when the primary gJVM receives a request from a non-primary gJVM to register a unique gJVM identifier (step 522). In contrast to FIG. 5A, in which a non-primary gJVM node relies upon the primary gJVM node to allocate a unique gJVM identifier, FIG. 5B shows an exemplary system in which the non-primary gJVM node allocates its own unique gJVM identifier and then registers its identifier with the primary gJVM node. The non-primary gJVM node may generate its own identifier that is guaranteed to be unique through execution of an algorithm for such purpose. For example, many devices are manufactured to include a readable, unalterable, serial number, sometimes referred to as a global unique identifier; since each gJVM node within a distributed gJVM cluster operates on a device, the GJVM node may use an algorithm to create a unique gJVM identifier, wherein the algorithm accepts a device's global unique identifier as input.

The primary gJVM then adds or registers the new gJVM identifier into the gJVM registry (step 524). The primary gJVM sets the run state of the non-primary gJVM in the gJVM registry to a starting state value (step 526), and then the primary gJVM responds to the requesting non-primary gJVM by sending a response message with a status value that indicates whether or not the registration was successful (step 528). The primary gJVM then broadcasts a message that contains the updated gJVM registry to all of the non-primary gJVM nodes (step 530), thereby concluding the process.

Figure 6:
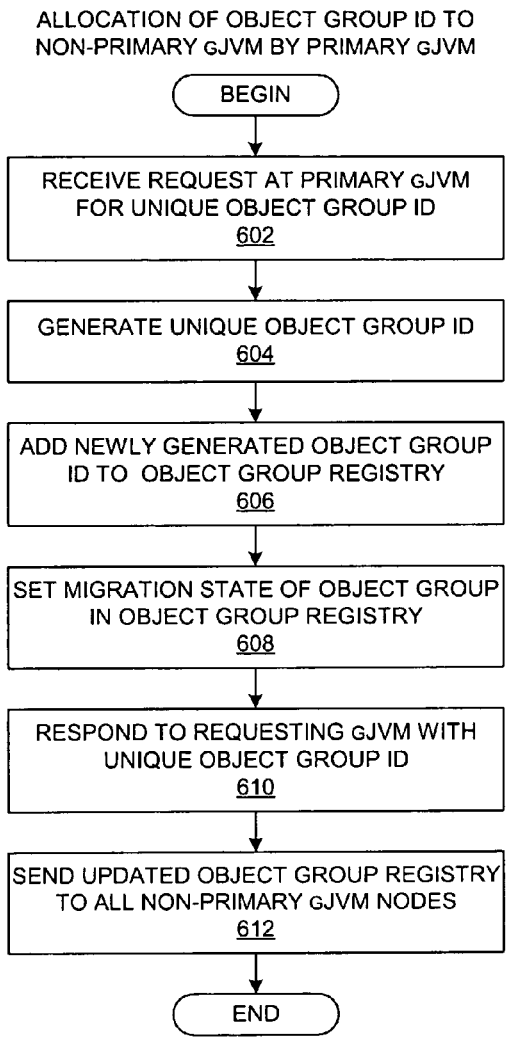
FIG. 6 depicts a flowchart that shows a process at a primary cJVM for allocating a unique object group identifier to a non-primary cJVM.

Allocation of an Object Group ID to a Non-Primary Grid-Enabled Virtual Machine Node With reference now to FIG. 6, a flowchart illustrates a process at a primary gJVM for allocating a unique object group identifier to a non-primary gJVM. The process commences when the primary gJVM receives a request from a non-primary gJVM for a unique object group identifier (step 602). The primary gJVM generates the unique object group identifier (step 604) and adds the newly generated object group identifier to the object group registry (step 606). The primary gJVM sets the migration state of the object group in the object group registry to a starting state value (step 608), and then the primary gJVM responds to the requesting non-primary gJVM by sending a message containing the newly generated unique object group identifier (step 610). The primary gJVM then broadcasts a message that contains the updated object group registry to all of the non-primary gJVM nodes (step 612), thereby concluding the process.

Alternatively, in contrast to FIG. 6 in which a non-primary gJVM node relies upon the primary gJVM node to allocate a unique object group identifier, an alternative process may be employed in which the non-primary gJVM node allocates its own unique object group identifier and then registers this newly generated object group identifier with the primary gJVM node. The non-primary gJVM node may generate its own object group identifier that is guaranteed to be unique through execution of an algorithm for such purpose, e.g., in a manner similar to that described above with respect to FIG. 5B.

Figure 7:
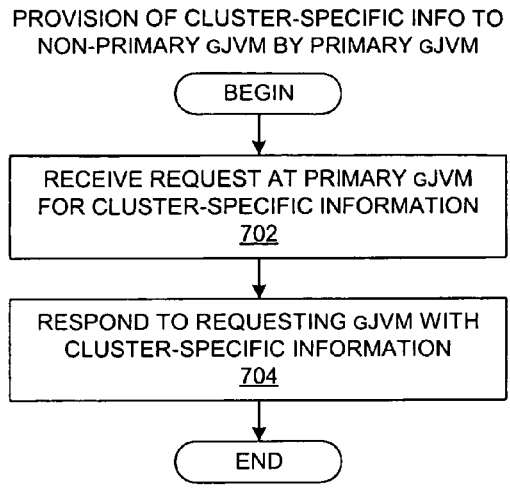
FIG. 7 depicts a flowchart that shows a process at a primary cJVM for providing information about the cJVM cluster to a non-primary cJVM.

Providing Cluster-Specific Information to Non-Primary Grid-Enabled Virtual Machine Nodes With reference now to FIG. 7, a flowchart illustrates a process at a primary gJVM for providing information about the gJVM cluster to a non-primary gJVM. The process commences when the primary gJVM receives a request from a non-primary gJVM for cluster-specific information, such as the current gJVM registry, the current object group registry, or the cluster's environment/context parameters (step 702). The primary gJVM responds to the requesting non-primary gJVM by sending a message containing the requested information (step 704), thereby concluding the process. In this manner, a non-primary gJVM node is able to obtain information from a primary gJVM node, assuming that an implementation of the present invention has a gJVM cluster in which a primary gJVM node manages cluster-specific information on behalf of non-primary gJVM nodes.

Changing Run State of Non-Primary Grid-enabled Virtual Machine Node

Figure 8:
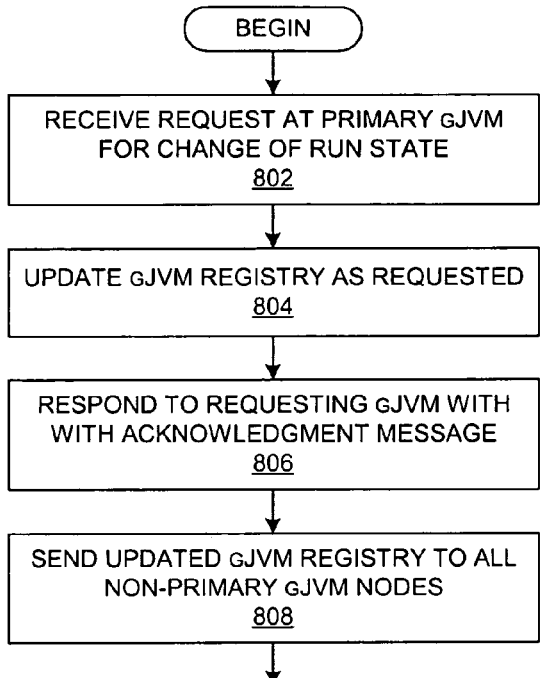
FIG. 8 depicts a flowchart that shows a process at a primary cJVM for changing a run state of a non-primary cJVM.

With reference now to FIG. 8, a flowchart illustrates a process at a primary gJVM for changing a run state of a non-primary gJVM. The process commences when the primary gJVM receives a request from a non-primary gJVM to change its run state (step 802). The primary gJVM updates the gJVM registry with the requested run state (step 804) and responds to the requesting non-primary gJVM with an acknowledgment message (step 806). The primary gJVM then broadcasts a message that contains the updated gJVM registry to all of the non-primary gJVM nodes (step 808), thereby concluding the process.

Figure 9:
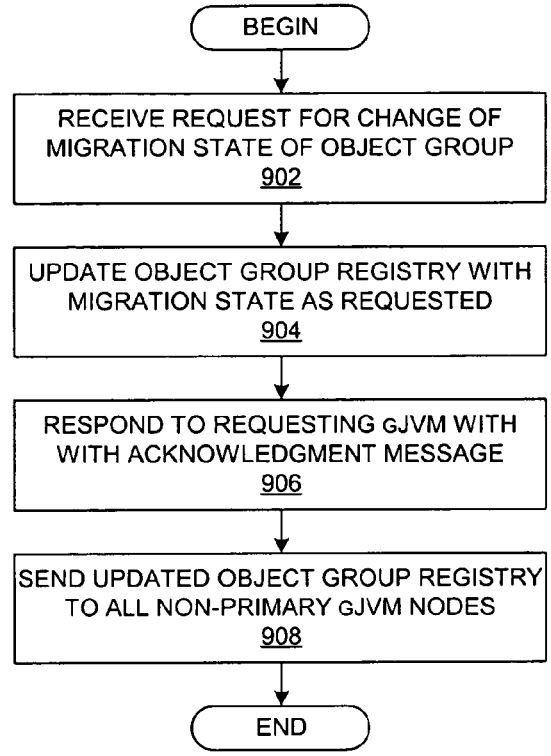
FIG. 9 depicts a flowchart that shows a process at a primary cJVM for changing a migration state of an object group.

Changing Object Group Migration State by Non-Primary Grid-enabled Virtual Machine Node With reference now to FIG. 9, a flowchart illustrates a process at a primary gJVM for changing a migration state of an object group. The process commences when the primary gJVM receives a request from a non-primary gJVM to change a migration state of an object group (step 902). The primary gJVM updates the object group registry with the requested migration state (step 904) and responds to the requesting non-primary gJVM with an acknowledgment message (step 906). The primary gJVM then broadcasts a message that contains the updated object group registry to all of the non-primary gJVM nodes (step 908), thereby concluding the process.

Initialization of Non-Primary Grid-Enabled Virtual Machine Node

Figure 10:
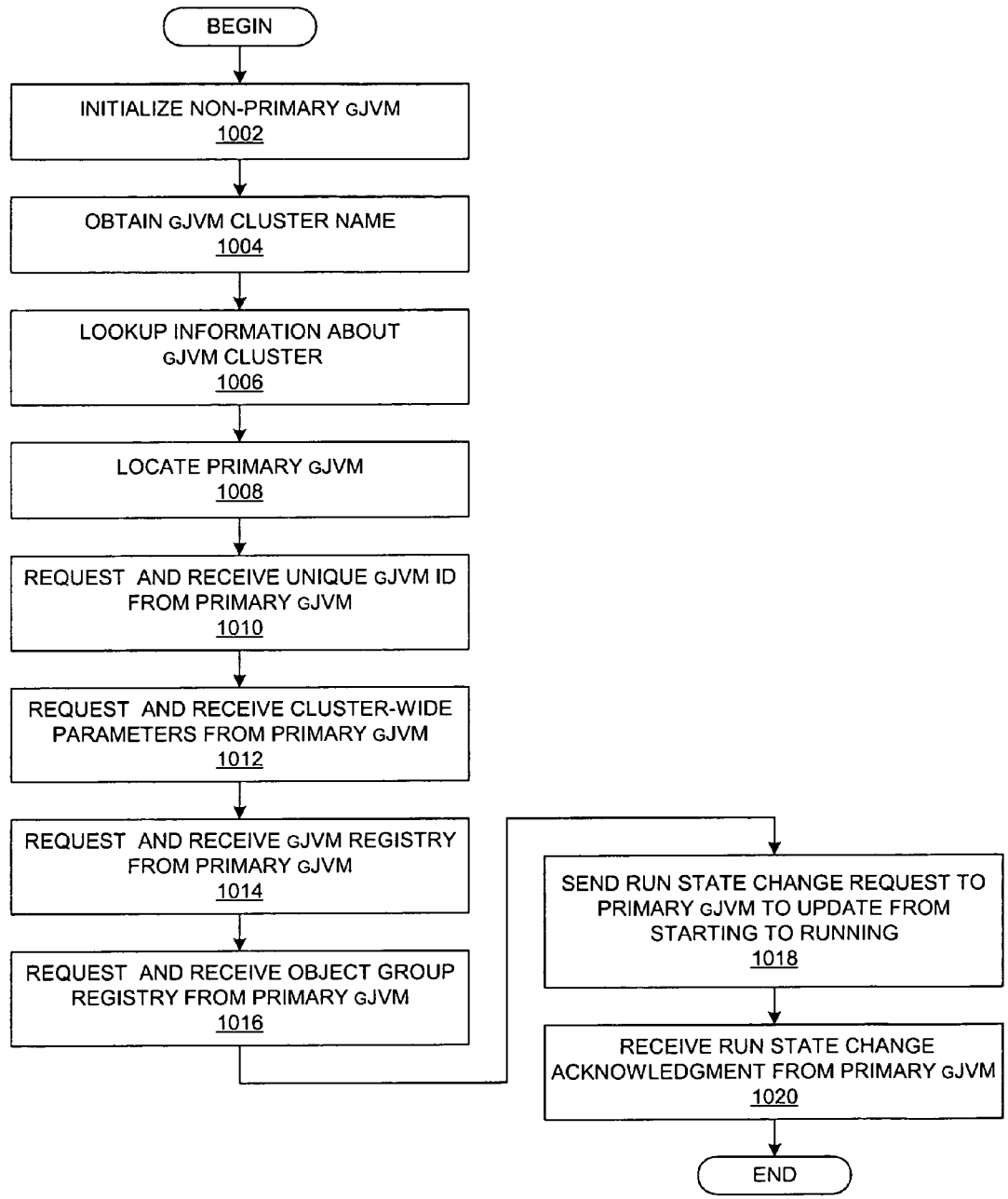
FIG. 10 depicts a flowchart that shows a process for initializing a non-primary cJVM node.

With reference now to FIG. 10, a flowchart illustrates a process for initializing a non-primary gJVM node in accordance with an embodiment of the present invention. The process commences when the non-primary clustered virtual machine node is initialized (step 1002), e.g., through the use of the instantiation command that was described above. The gJVM cluster name is obtained, e.g., from the instantiation command (step 1004), and a lookup operation is performed using the gJVM cluster name (step 1006), e.g., to obtain network parameters from a globally available database to initiate communication with the primary gJVM node for the identified gJVM cluster (step 1008).

The non-primary gJVM node requests and receives a unique gJVM identifier from the primary GJVM node (step 1010), e.g., as shown in FIG. 5A or FIG. 5B. The non-primary gJVM node obtains any cluster-wide information, such as environment parameters or context parameters that are used by the gJVM cluster (step 1012), e.g., as shown in FIG. 7. The non-primary gJVM node also requests and receives from the primary gJVM node the gJVM registry (step 1014) and the object group registry (step 1016), e.g., as shown in FIG. 7. Although steps 1010-1016 are illustrated as being implemented in a synchronous manner, the steps may be performed asynchronously in a variety of manners. Since the non-primary gJVM node has completed its initialization, the non-primary gJVM node sends to the primary gJVM node a request to change its run state from a value that indicates that it is in a starting state to a value that indicates that it is in a running state (step 1018). Assuming that the request was successfully executed, the non-primary gJVM node receives an acknowledgment from the primary gJVM node (step 1020), thereby concluding the process.

Whereas FIG. 10 illustrates an initialization process at a non-primary gJVM node, FIGS. 5A-9 illustrate processes by which a primary gJVM node performs tasks as requested by non-primary GJVM nodes to centrally manage information on behalf of the GJVM cluster as a whole. The remaining figures depict processes through which the non-primary gJVM nodes manage object groups and threads within a gJVM cluster; in other words, the remaining figures illustrate processes from the perspective of a non-primary gJVM node. However, it should be noted that a primary gJVM node executes similar processes with respect to management of its object groups and threads; in those instances in which a figure illustrates a step in a process in which information is transferred to or received from a primary gJVM node, it should be understood that a primary gJVM node would execute a similar step except that the primary gJVM node could place information directly into cluster-specific tables or databases, such as the gJVM registry or the object group registry, without having to coordinate the step with itself, i.e., the primary gJVM node.

Thread Construction in Grid-Enabled Virtual Machine Node

With reference now to FIG. 11, a flowchart illustrates a process on a clustered virtual machine during which a thread is constructed. The process commences when a local gJVM receives a request to construct a thread (step 1102), e.g., through an appropriate API call by an application that is executing under the control of the clustered virtual machine, although it is possible for the local gJVM to perform a similar process on its own initiative while it controls the execution of applications on the virtual machine. The local gJVM node, which in some cases may be assumed to be a non-primary gJVM, sends a request to the primary gJVM for a unique object group identifier and then receives it (step 1104). The local gJVM constructs the thread (step 1106), which may entail the creation of various thread management objects and the updating of various thread management tables. A unique thread identifier is generated and assigned to the newly constructed thread (step 1108). The local gJVM then allocates a thread local heap (step 1110) and creates or demarcates an object group within the thread local heap (step 1112), which, depending on the implementation, preferably stores the thread-related objects. The newly created object group identifier is associated with the newly constructed thread (step 1114), e.g., by updating the appropriate management tables.

The local gJVM then sends a request to the primary gJVM to change the migration state of the object group from a value indicating a starting state, which was set by the primary gJVM when the new object group identifier was requested, to a value indicating a stable state (step 1116). The local gJVM then receives a migration state change acknowledgment from the primary gJVM (step 1118). The local gJVM then returns a response for the thread construction, which may contain the thread identifier and other thread-related information, to the requesting application (step 1120), thereby concluding the process.

Thread Destruction in Grid-Enabled Virtual Machine Node

With reference now to FIG. 12, a flowchart illustrates a process on a clustered virtual machine during which a thread is destroyed. The process commences when a local GJVM receives a request to destroy a thread (step 1202), e.g., through an appropriate API call by an application that is executing under the control of the clustered virtual machine, although a similar process may occur when the local gJVM decides to destroy a thread on its own initiative, e.g., due to various termination conditions.

Assuming that the object groups that are associated with the terminating thread have external/remote/foreign references to objects within themselves, then the object groups need to be preserved, even though the thread that was originally the reason for creating the object groups is now being terminated or destroyed. Hence, the local gJVM disassociates the thread identifier of the terminating thread from each associated object group in an appropriate manner (step 1204), which may include updating various thread management tables and object group management tables (step 1206). If necessary, depending upon the memory allocation methods in the local gJVM, object groups may need to be moved from thread local heaps to general heaps within the local gJVM (step 1208). It may often be the case that terminating a thread results in almost all of its objects being garbage collected; in an alternative embodiment, objects that remain because they are remotely referenceable may be moved to a master global object group.

The thread is then destroyed (step 1210), e.g., by destroying the thread-related management objects that were used to control the thread. A response for the thread destruction operation is then returned to the requesting application (step 1212), thereby concluding the process.

Object Allocation in Grid-Enabled Virtual Machine Node

Figure 13:
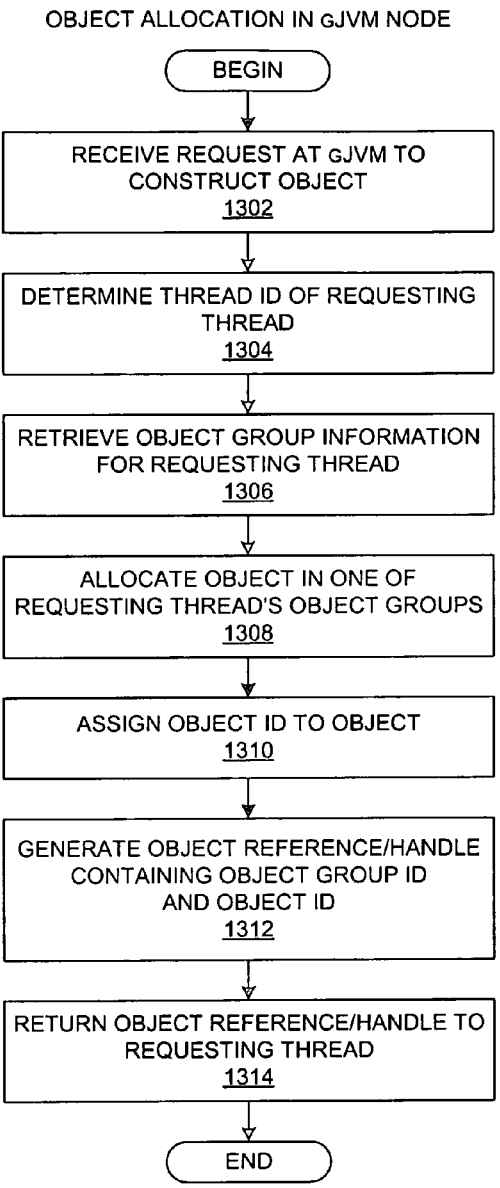
FIG. 13 depicts a flowchart that shows a process on a clustered virtual machine during which an object is constructed.

With reference now to FIG. 13, a flowchart illustrates a process on a clustered virtual machine during which an object is constructed. The process commences when the local gJVM node receives a request to construct an object (step 1302) e.g., through an appropriate API call by an application that is executing under the control of the clustered virtual machine, although a similar process may occur when the local gJVM decides to create an object on its own initiative. The thread identifier of the requesting thread is determined (step 1304), and the object group information for an object group that is associated with the requesting thread is retrieved (step 1306). The local gJVM then allocates an object in one of the requesting thread's object groups (step 1308), and an object identifier for the newly allocated object is generated and assigned to the object (step 1310). An object reference/handle for the newly created object is created (step 1312), which may contain the object group identifier and the object identifier, depending upon the manner in which object references are implemented. The object reference/handle is then returned to the requesting thread (step 1314), thereby concluding the process.

Object Referencing in Grid-Enabled Virtual Machine Node

Figure 14:
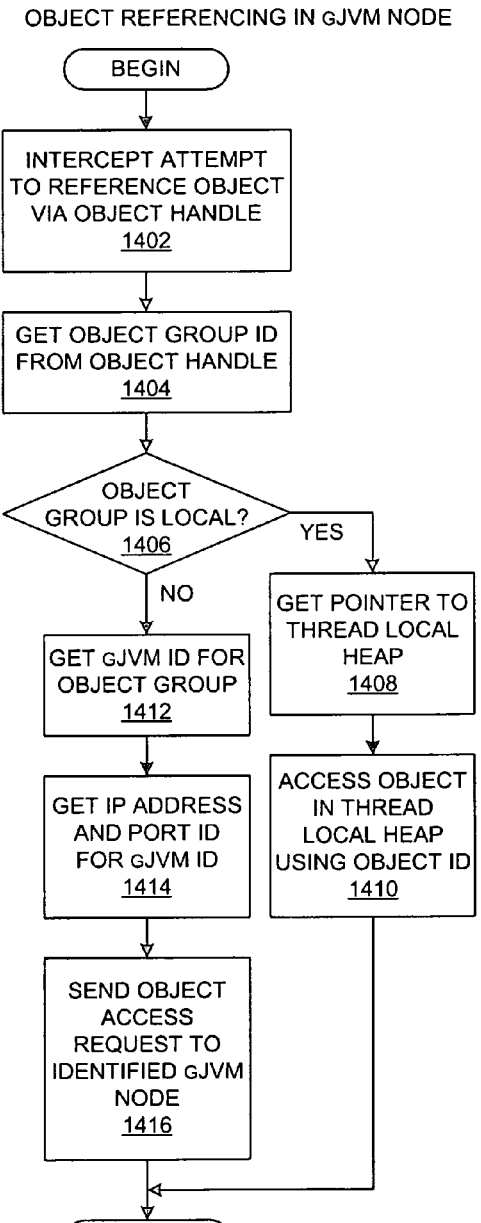
FIG. 14 depicts a flowchart that shows a process on a clustered virtual machine for handling accesses to objects.

With reference now to FIG. 14, a flowchart illustrates a process on a clustered virtual machine for handling accesses to objects. The process commences with the local gJVM intercepting an attempt to access or reference an object via an object handle (step 1402). The local gJVM retrieves the object group identifier from the object handle (step 1404) and determines whether the identified object group is managed locally or remotely (step 1406), e.g., by consulting an object group management table. If the object is stored locally, then the local gJVM obtains the pointer to the appropriate thread local heap (step 1408) and accesses the object in the thread local heap using the object identifier (step 1410).

If the object is stored remotely, then the local gJVM obtains the identifier of the remote gJVM node of the object group in which the object is located (step 1412). The IP address and port ID of the remote gJVM is retrieved (step 1414), e.g., from the local copy of the gJVM registry. The local gJVM then sends an object access request to the remote gJVM (step 1416), thereby concluding the process.

Migration of Object Group From Grid-Enabled Virtual Machine Node

With reference now to FIG. 15, a flowchart illustrates a process on a local clustered virtual machine for migrating an object group to a remote clustered virtual machine. The process commences when the local gJVM node prepares to migrate an object group from the local gJVM node to a remote gJVM node (step 1502), which may entail sending a request message to the remote gJVM to migrate the object group. This preparation to migrate an object group may occur as a result of various conditions, which are described in more detail further below. For example, as described with respect to FIG. 19, prior to stopping a gJVM node, any object groups within the gJVM node would be migrated to other gJVM nodes with the gJVM cluster.

The local gJVM sends a request to the primary gJVM to change the migration state of the migrating object group from stable to migrating (step 1504), after which the local gJVM receives a migration state change acknowledgment from the primary gJVM (step 1506). The local gJVM then flattens or serializes each object in the migrating object group (step 1508) and pushes the flattened or serialized objects from the local gJVM to the remote gJVM in some manner such that the object remain associated with the object group (step 1510), after which the local gJVM receives an acknowledgment from the remote gJVM (step 1512). The local gJVM then destroys the object group and/or heap within the local gJVM for the object group that has just been moved (step 1514) while also clearing or updating the object group entry in the local object group table along with any other table or database entries that need to be cleared or updated within the local gJVM node (step 1516) because the object group is now located within a different gJVM node, thereby concluding the process.

Migration of Object Group To Grid-Enabled Virtual Machine

With reference now to FIG. 16, a flowchart illustrates a process on a local clustered virtual machine for accepting the migration of an object group from a remote clustered virtual machine. The process that is shown in FIG. 16 should be viewed as complementary to the process that is shown in FIG.

15; the local gJVM and the remote gJVM in FIG. 15 are the remote gJVM and the local gJVM in FIG. 16, respectively reversing their roles.

The process commences when the local gJVM receives a request to migrate an object group from the remote gJVM to the local gJVM (step 1602), after which the local gJVM allocates thread local heap or other appropriate type of heap (step 1604) and receives the flattened or serialized objects in the object group from the remote gJVM (step 1606). The local gJVM reads or inflates the objects into the chosen location within the local gJVM (step 1608) and associates the received object group with a thread (step 1610), if necessary, e.g., if a thread was migrated along with the object group. The local gJVM then performs the appropriate administrative tasks for managing the newly received object group, such as creating an object group entry in the local object group table (step 1612). The local gJVM then sends a request to the primary gJVM to change the migration state of the migrating object group from migrating to stable (step 1614), after which the local gJVM receives a migration state change acknowledgment from the primary gJVM (step 1616). The local gJVM then sends an acknowledgment message to the remote gJVM that indicates the completion of the migration of the object group (step 1618), thereby concluding the process.

Migration of Thread From Grid-Enabled Virtual Machine

Figures 17, 18:
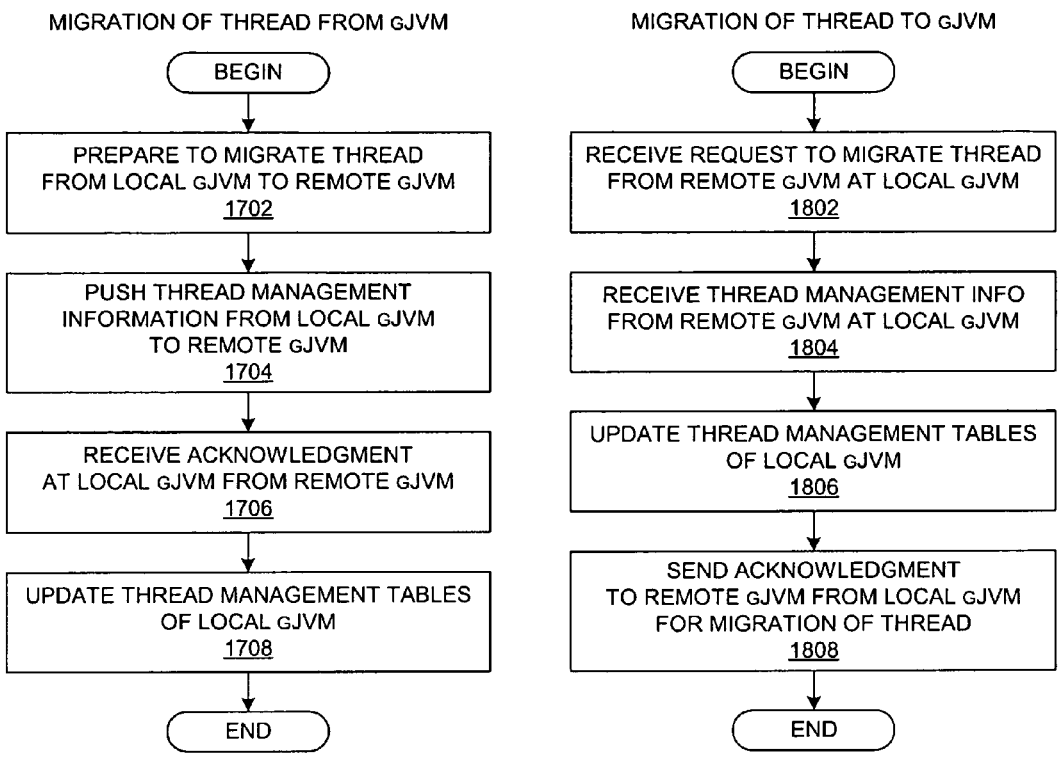
FIG. 17 depicts a flowchart that shows a process on a local clustered virtual machine for migrating a thread to a remote clustered virtual machine.
FIG. 18 depicts a flowchart that shows a process on a local clustered virtual machine for accepting the migration of a thread from a remote clustered virtual machine.

With reference now to FIG. 17, a flowchart illustrates a process on a local clustered virtual machine for migrating a thread to a remote clustered virtual machine. The process commences when the local gJVM node prepares to migrate a thread from the local gJVM node to a remote gJVM node (step 1702), which may entail sending a request message to the remote gJVM to migrate the thread. This preparation to migrate a thread may occur as a result of various conditions, which are described in more detail further below. The local gJVM pushes the thread management information from the local gJVM to the remote gJVM (step 1704); the thread management information may comprise information in the local thread management tables within the local gJVM node, after which the local gJVM receives an acknowledgment from the remote gJVM (step 1706). The local gJVM then updates the local thread management tables as necessary to reflect the fact that the thread has been moved to a different gJVM node (step 1708), thereby concluding the process.

Migration of Thread To Grid-Enabled Virtual Machine

With reference now to FIG. 18, a flowchart illustrates a process on a local clustered virtual machine for accepting the migration of a thread from a remote clustered virtual machine. The process that is shown in FIG. 18 should be viewed as complementary to the process that is shown in FIG. 17; the local gJVM and the remote gJVM in FIG. 17 are the remote gJVM and the local gJVM in FIG. 18, respectively reversing their roles.

The process commences when the local gJVM receives a request to migrate a thread from the remote gJVM to the local gJVM (step 1802), after which the local gJVM receives the thread management information for the thread from the remote gJVM (step 1804). The local gJVM then performs the appropriate administrative tasks for managing the newly received thread, such as updating the local thread management tables (step 1806). The local gJVM then sends an acknowledgment message to the remote gJVM that indicates the completion of the migration of the thread (step 1808), thereby concluding the process.

Shutdown of Grid-Enabled Virtual Machine

Figure 19:
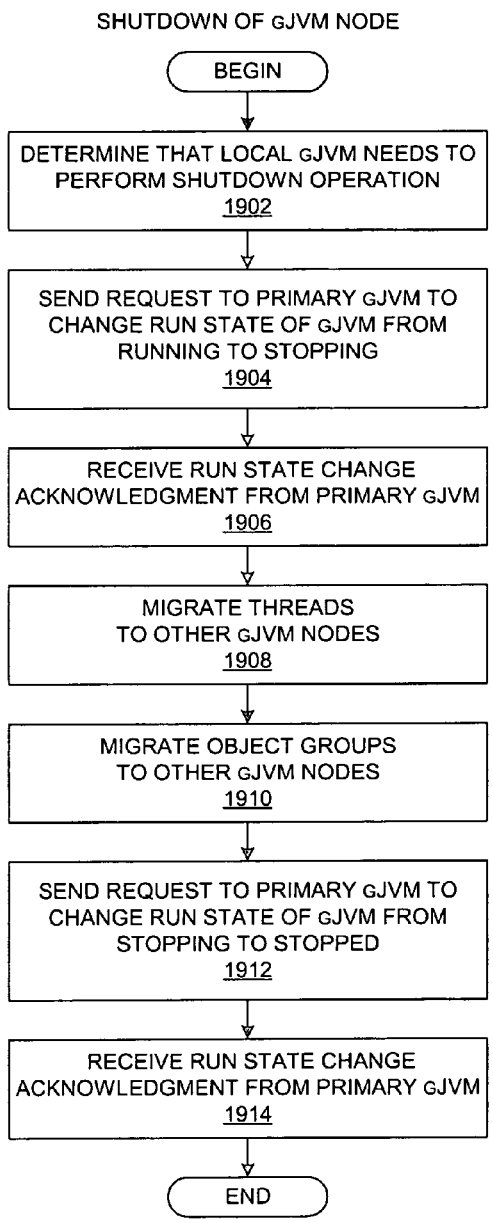
FIG. 19 depicts a flowchart that shows a process on a local clustered virtual machine for performing a shutdown operation on a clustered virtual machine.

With reference now to FIG. 19, a flowchart illustrates a process on a local clustered virtual machine for performing a shutdown operation on a clustered virtual machine. The process commences with the determination that the local gJVM needs to perform a shutdown operation (step 1902). The shutdown operation may be the result of a determination within the local gJVM node to self-terminate for a variety of reasons; alternatively, the determination to shutdown the gJVM node may be controlled by the primary gJVM node, by an administrative utility, by an administrative command, or by some other mechanism. The local gJVM node sends a request to the primary gJVM node to change the run state of the local gJVM node from a value that indicates a running state to a value that indicates a stopping state (step 1904), after which the local GJVM node receives an acknowledgment message from the primary gJVM (step 1906). The local gJVM then begins to migrate all of its threads to other gJVM nodes (step 1908) while also migrating all of its object groups to other gJVM nodes (step 1910). As discussed in more detail below, a gJVM node may perform the migration operations in accordance with information about the performance characteristics of other gJVM nodes within the gJVM cluster. The local gJVM node then sends a request to the primary gJVM node to change the run state of the local gJVM node from a value that indicates a stopping state to a value that indicates a stopped state (step 1912), after which the local gJVM node receives an acknowledgment message from the primary gJVM (step 1914), thereby concluding the process.

As mentioned above, a primary node can delegate or hand-off its responsibilities to a non-primary node in order to enable the primary node to shutdown for maintenance or for other purposes after the system has been started. If a primary node starts a shutdown process, the primary node selects a non-primary node to act as the newly delegate primary node, possibly through a request/response mechanism. In this manner, the primary node performs additional operations that are not performed by a non-primary node during the period of time that the primary node is in a stopping state. Subsequent to the delegation operation, the newly delegated primary node may broadcast its new identity as the primary node for the virtual machine cluster to the other non-primary nodes within the virtual machine cluster, which would update their informational data structures accordingly.

Performance Information Gathering by Grid-Enabled Virtual Machine

Figure 20:
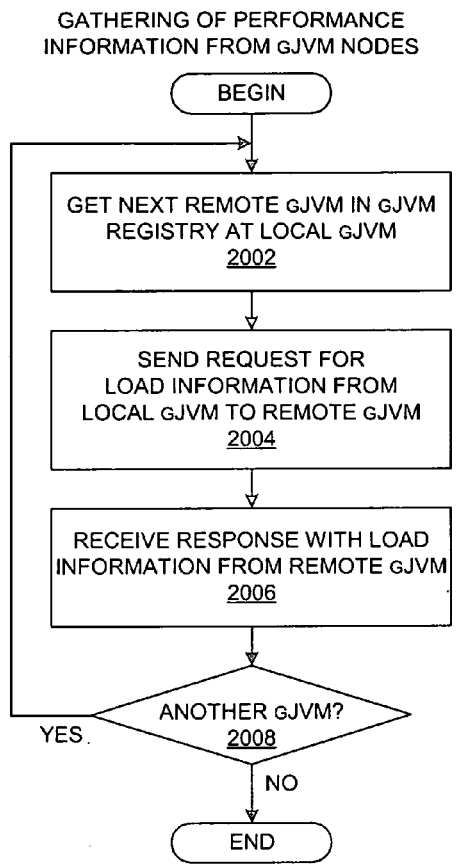
FIG. 20 depicts a flowchart that shows a process on a local clustered virtual machine for gathering load or performance information from a remote clustered virtual machine.

With reference now to FIG. 20, a flowchart illustrates a process on a local clustered virtual machine for gathering load or performance information from a remote clustered virtual machine. The process that is shown in FIG. 20 performs an operation with respect to all of the known remote gJVM nodes in an iterative manner. Hence, the process commences with the local gJVM node obtaining information from the local copy of the gJVM registry about a next remote gJVM node that has not yet been processed within the iterative loop (step 2002). The local gJVM then sends a request message to the identified remote gJVM node for its load information (step 2004), after which the local gJVM receives a response message that contains the load information for the remote gJVM node (step 2006); the information may be stored within a local table or database for subsequent analysis, e.g., using the process that is described with respect to FIG. 22 hereinbelow. The local gJVM node then checks if there are any unprocessed gJVM nodes within the local gJVM registry (step 2008). If so, then the process branches back to step 2002 to process another remote gJVM node; if there are not any unprocessed remote gJVM nodes, then the process is concluded.

Performance Information Gathering by Grid-Enabled Virtual Machine

With reference now to FIG. 21, a flowchart illustrates a process on a local clustered virtual machine for responding to a request from a clustered virtual machine for the current load or performance information at the local clustered virtual machine. The process that is shown in FIG. 21 should be viewed as complementary to the process that is shown in FIG. 20; the local gJVM and the remote gJVM in FIG. 20 are the remote gJVM and the local gJVM in FIG. 21, respectively reversing their roles. The process commences when the local gJVM receives a request message for the load information on the local gJVM and/or the local device (step 2102). For example, the load information may include values that indicate CPU utilization, memory utilization, other hardware, software, or computational resource utilization information for the data processing device on which the local gJVM node is operating, computational resource utilization information for resources within or controlled by the gJVM, and other information. The local gJVM then sends a response message containing the requested load information (step 2104), thereby concluding the process.

Load Balancing Operation Between Grid-Enabled Virtual Machine Nodes

With reference now to FIG. 22, a flowchart illustrates a process on a local clustered virtual machine for determining to migrate threads and/or object groups from the local clustered virtual machine to a remote clustered virtual machine in accordance with load or performance information. The process commences when the local gJVM node determines to start a load balancing operation (step 2202); if appropriate, the local gJVM node obtains or checks its own load information (step 2204). The local gJVM also obtains the load information from other gJVM nodes within the gJVM cluster (step 2206), e.g., using the processes that are described above with respect to FIG. 20 and FIG. 21, although the load information from the other gJVM nodes might be gathered only after a determination has been made to initiate the load-balancing operation.

The load balancing operation may be performed in order to ensure that the workload caused by executing various applications within the cluster is distributed throughout the gJVM cluster. The load balancing operation may be the result of a determination within the local gJVM node to initiate a load balancing operation in accordance with an algorithm that might be employed by all gJVM nodes within a gJVM cluster; alternatively, the determination to perform the load balancing operation may be controlled by the primary gJVM node, by an administrative utility, by an administrative command, or by some other mechanism. For example, the local gJVM node may perform the load balancing operation after it has constructed a thread and is ready to dispatch the thread; alternatively, to save computational resources, the load balancing operation might be performed periodically, e.g., after every tenth newly constructed thread.

The local gJVM node then begins to evaluate its load information to check whether or not some resource on the local gJVM node has exceeded a configurable threshold value, e.g., as indicated within cluster-specific context parameters. In the example that is shown in FIG. 22, two evaluations are performed; the number of evaluations that are performed may depend on the load-balancing algorithm, the available load information, or some other factor.

A determination is made as to whether or not the CPU load value for the local gJVM node exceeds a CPU-load threshold value (step 2208); if not, then the process branches to step 2214. If the CPU load value for the local gJVM node exceeds a configurable CPU-load threshold value, then the local gJVM node selects a remote gJVM node with available CPU resources (step 2210), e.g., by analyzing the load information that was previously gathered from the remote gJVM nodes with respect to configurable load threshold values. The local gJVM node then begins a migration operation to move threads from the local gJVM node to one or more selected remote gJVM nodes (step 2212), e.g., using the processes that are described above with respect to FIG. 17 and FIG. 18.

A determination is then made as to whether or not the memory load value for the local gJVM node exceeds a memory-load threshold value (step 2214); if not, then the process is concluded. If the memory load value for the local gJVM node exceeds a configurable memory-load threshold value, then the local gJVM node selects a remote gJVM node with available memory resources (step 2216), e.g., by analyzing the load information that was previously gathered from the remote gJVM nodes with respect to configurable load threshold values. The local gJVM node then begins a migration operation to move object groups from the local gJVM node to one or more selected remote gJVM nodes (step 2218), e.g., using the processes that are described above with respect to FIG. 16 and FIG. 16, thereby concluding the process.

Multi-Threaded Application on Logical Virtual Machine

Figure 23:
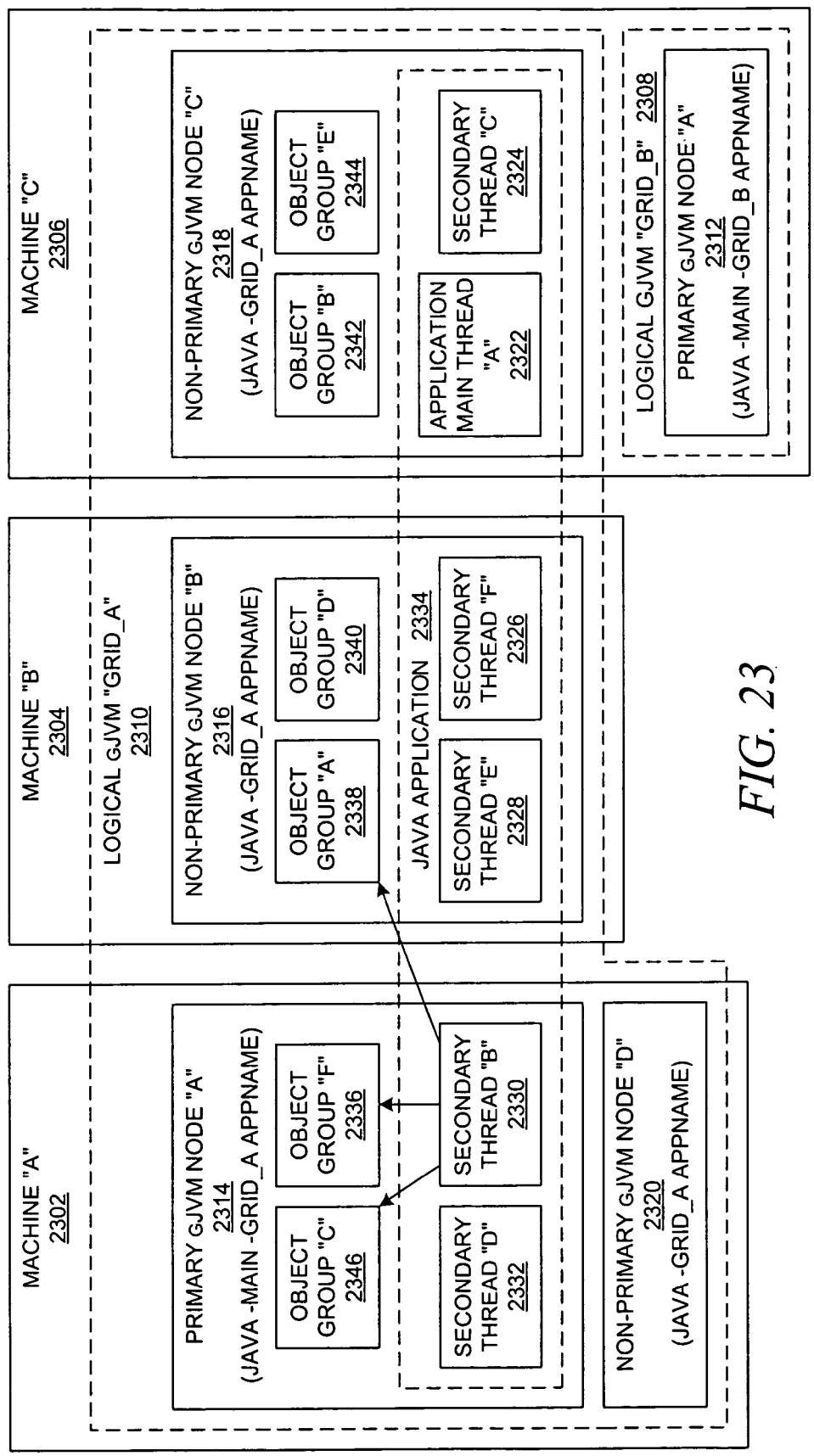
FIG. 23 depicts a block diagram that shows the execution of a single application image that spans multiple grid-enabled virtual machines in a single logical virtual machine over multiple devices.

With reference now to FIG. 23, a block diagram depicts the execution of a single application image that spans multiple grid-enabled virtual machines in a single logical virtual machine over multiple devices. Machines 2302-2306 support logical virtual machine 2308 and logical virtual machine 2310.

Logical virtual machine 2308 includes only a single node that is represented by primary gJVM node 2312, which may have been invoked through a command line interface that specified "GRID_B" as the cluster name for logical virtual machine 2308. Logical virtual machine 2308 is supported upon a single device, i.e., machine 2306.

In contrast, logical virtual machine 2310 includes multiple gJVM nodes 2314-2320 that are supported by multiple devices, i.e., machines 2302-2306; machine 2302 happens to be concurrently supporting two gJVM nodes 2314 and 2320. Virtual machines 2314-2320 interoperate as a single logical virtual machine. In this example, virtual machines 2314-2320 are implemented using Java® technology; hence, virtual machines 2314-2320 may be described as Java® virtual machines. Since virtual machines 2314-2320 have embedded functionality for interoperating in a grid-like manner as a logical virtual machine, virtual machines 2314-2320 may be described as grid-enabled Java® virtual machines (gJVM's), each of which is a node within logical gJVM 2310.

Each of gJVM nodes 2314-2320 may have been invoked through a command line interface that specified "GRID_A" as the cluster name for logical gJVM 2310. Nodes 2316-2320 are non-primary nodes; gJVM 2314 was designated as the primary node at startup, although it may delegate its status as primary node to another node within logical gJVM 2310 at a later point in time. In this example, nodes 2314-2320 are unique instances of the same gJVM application program. Using the methods that are described above, gJVM nodes 2316-2320 register into the cluster/grid of nodes that is managed by primary gJVM node 2314; remote references to objects and coordination between the gJVM nodes are provided through the gJVM-gJVM (peer-to-peer) communications links that the gJVM nodes are able to establish.

With the present invention, multiple gJVM nodes interoperate as a logical gJVM so that an application program that starts on one gJVM node may subsequently execute in a manner that spans multiple gJVM nodes. In the example in FIG. 23, an application that includes main thread 2322 has been started on gJVM node 2318, and one of its secondary threads 2324 also executes on gJVM node 2318. In addition, secondary threads 2326-2332 of the same application execute on gJVM nodes 2314 and 2316 within logical gJVM 2310.

The present invention allows nodes 2314-2320 to share the workload of Java® application 2334 that is executing on logical gJVM 2310 without requiring Java® application 2334 to deviate from the standard Java® application model; in other words, Java® application 2334 does not require any proprietary functionality, and gJVM nodes 2314-2320 do not require proprietary application agents to act on behalf of Java® application 2334 across multiple JVM's. With the present invention, gJVM nodes 2314-2320 have embedded functionality for interoperating in a grid-like manner to execute Java® applications.

Object groups 2336-2346 are distributed throughout logical gJVM 2310. Any given application thread may reference objects that exist in several object groups, whether or not the application thread or another thread within the same application constructed or allocated those object groups. Hence, a given thread may reference an object in a local object group or an object in a remote object group, whether or not the object group is associated with the given thread or another thread on the local gJVM node or on a remote gJVM node. If fact, the object group may not be associated with any extant thread, or the object may be contained in a so-called global object group on the local gJVM node or on a remote gJVM node. In the example that is shown in FIG. 23, thread 2330 is shown as referencing an object or objects in object groups 2336 and 2346 within local gJVM node 2314 while also referencing an object or objects in object group 2338 within remote gJVM node 2316.

The advantages of the present invention should be apparent with reference to the detailed description that is provided above. Applications that execute on virtual machines may be run in a grid-like manner over a plurality of virtual machines, thereby enabling computational resources to be provided as a utility-like service for compensation. When data processing systems and devices are shutdown, the clusterable virtual machines on those systems and devices may be stopped; threads and objects on those systems and devices may be migrated to other systems and devices while the virtual machine cluster allows any applications to continue to run, albeit on a set of different systems and devices.

It is important to note that while the present invention has been described in the context of a fully functioning data processing system, those of ordinary skill in the art will appreciate that the processes of the present invention are capable of being distributed in the form of instructions in a computer readable medium and a variety of other forms. Examples of computer readable media include media such as EPROM, ROM, tape, floppy disk, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for operating a virtual machine within a data processing system, the method comprising the computer-implemented steps of:
   a processor;
   the processor for storing an object in memory that is managed by a virtual machine that is running on a device within the data processing system;
   associating the object with a plurality of objects within an object group;
   associating the object group with the virtual machine, wherein the virtual machine incorporates functionality for interoperating with other virtual machines in a virtual machine cluster, and wherein each virtual machine in the virtual machine cluster acts as a node within the virtual machine cluster, and wherein associating the object group with the virtual machine comprises:
   associating the object group with a thread managed by the virtual machine; and storing the object group in a thread local heap associated with the thread;
   managing a plurality of object groups within each virtual machine of the virtual machine cluster;
   allowing the object group to be moved from the virtual machine to a different virtual machine in the virtual machine cluster;
   disassociating the object group from the virtual machine, wherein disassociating the object group from the virtual machine comprises:
   disassociating the object group from the thread;
   terminating the thread; and
   in response to terminating the thread, managing the object group without an association between the object group and the thread managed by the virtual machine;
   moving the object group to the different virtual machine in the virtual machine cluster; and
   in response to moving the object group to the different virtual machine, associating the object group with the different virtual machine, wherein associating the object group with the different virtual machine comprises:
   creating a first object reference for the object while the object is located on the virtual machine;
   moving the object group with which the object is associated to the different virtual machine; and
   creating a second object reference for the object while the object is located on the different virtual machine, wherein the first object reference and the second object reference are identical.

2. A computer program product on a computer readable medium for use in a data processing system for operating a virtual machine, the computer program product comprising:
   a processor;
   means for storing an object in memory that is managed by a virtual machine that is running on a device within the data processing system;

means for associating the object with a plurality of objects within an object group;

means for associating the object group with the virtual machine, wherein the virtual machine incorporates functionality for interoperating with other virtual machines in a virtual machine cluster, and wherein each virtual machine in the virtual machine cluster acts as a node within the virtual machine cluster, and wherein the means for associating the object group with the virtual machine comprises:

means for associating the object group with a thread managed by the virtual machine; and means for storing the object group in a thread local heap associated with the thread;

means for managing a plurality of object groups within each virtual machine of the virtual machine cluster;

means for allowing the object group to be moved from the virtual machine to a different virtual machine in the virtual machine cluster;

means for disassociating the object group from the virtual machine, wherein the means for disassociating the object group from the virtual machine comprises:

means for disassociating the object group from the thread;

means for terminating the thread; and in response to terminating the thread, managing the object group without an association between the object group and the thread managed by the virtual machine;

means for moving the object group to the different virtual machine in the virtual machine cluster; and in response to moving the object group to the different virtual machine, means for associating the object group with the different virtual machine, wherein the means for associating the object group with the different virtual machine comprises:

means for creating a first object reference for the object while the object is located on the virtual machine;

means for moving the object group with which the object is associated to the different virtual machine; and means for creating a second object reference for the object while the object is located on the different virtual machine, wherein the first object reference and the second object reference are identical.

3. An apparatus in a data processing system for operating a virtual machine, the apparatus comprising:

a processor;

means for storing an object in memory that is managed by a virtual machine that is running on a device within the data processing system;

means for associating the object with a plurality of objects within an object group;

means for associating the object group with the virtual machine, wherein the virtual machine incorporates functionality for interoperating with other virtual machines in a virtual machine cluster, wherein each virtual machine in the virtual machine cluster acts as a node within the virtual machine cluster, and wherein the means for associating the object group with the virtual machine comprises:

means for associating the object group with a thread managed by the virtual machine; and means for storing the object group in a thread local heap associated with the thread;

means for managing a plurality of object groups within each virtual machine of the virtual machine cluster;

means for allowing the object group to be moved from the virtual machine to a different virtual machine in the virtual machine cluster;

means for disassociating the object group from the virtual machine, wherein the means for disassociating the object group from the virtual machine comprises:

means for disassociating the object group from the thread;

means for terminating the thread; and in response to terminating the thread, means for managing the object group without an association between the object group and the thread managed by the virtual machine;

means for moving the object group to the different virtual machine in the virtual machine cluster; and in response to moving the object group to the different virtual machine, means for associating the object group with the different virtual machine, wherein the means for associating the object group with the different virtual machine comprises:

means for creating a first object reference for the object while the object is located on the virtual machine;

means for moving the object group with which the object is associated to the different virtual machine; and means for creating a second object reference for the object while the object is located on the different virtual machine, wherein the first object reference and the second object reference are identical.

\* \* \* \* \*